United States Patent
Li et al.

(10) Patent No.: US 11,696,245 B2
(45) Date of Patent: Jul. 4, 2023

(54) SYNCHRONIZATION SIGNAL TRANSMISSION METHOD AND APPARATUS

(71) Applicant: Huawei Technologies Co., Ltd., Shenzhen (CN)

(72) Inventors: Chao Li, Beijing (CN); Pu Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 17/171,492

(22) Filed: Feb. 9, 2021

(65) Prior Publication Data

US 2021/0204238 A1 Jul. 1, 2021

Related U.S. Application Data

(63) Continuation of application No. PCT/CN2019/099724, filed on Aug. 8, 2019.

(30) Foreign Application Priority Data

Aug. 10, 2018 (CN) .......................... 201810911157.8

(51) Int. Cl.
*H04W 56/00* (2009.01)
*H04L 27/26* (2006.01)
*H04W 84/06* (2009.01)

(52) U.S. Cl.
CPC ..... *H04W 56/0015* (2013.01); *H04L 27/2607* (2013.01); *H04W 84/06* (2013.01)

(58) Field of Classification Search
CPC ... H04W 56/0015; H04W 84/06; H04W 4/40; H04W 56/002; H04W 56/00; H04W 4/44;
(Continued)

(56) References Cited

U.S. PATENT DOCUMENTS 8,320,360 B2 11/2012 Fukuta et al.
2008/0273522 A1 11/2008 Luo et al.
(Continued)

FOREIGN PATENT DOCUMENTS

CN 102025394 A 4/2011
CN 102857457 A 1/2013
(Continued)

OTHER PUBLICATIONS

3GPP TS 38.211 V15.1.0; 3rd Generation Partnership Project; Technical Specification Group Radio Access Network; NR; Physical channels and modulation (Release 15); Mar. 2018.*
(Continued)

*Primary Examiner* — Derrick W Ferris
*Assistant Examiner* — Mohammed M Murshid
(74) *Attorney, Agent, or Firm* — Slater Matsil, LLP

(57) ABSTRACT

According to the method and the apparatus, a first device generates a first synchronization sequence and/or a second synchronization sequence, where the first synchronization sequence is different from any sequence of a third synchronization sequence set, and/or the second synchronization sequence is different from any sequence of a fourth synchronization sequence set.

21 Claims, 3 Drawing Sheets

(58) Field of Classification Search
CPC .. H04W 4/46; H04L 27/2607; H04L 27/2613; H04L 5/0048; H04J 11/0073; H04J 11/0076; H04J 13/0025; H04J 13/0074
See application file for complete search history.

(56) References Cited

U.S. PATENT DOCUMENTS

| | | | | |
|---|---|---|---|---|
| 2013/0122917 | A1* | 5/2013 | Yavuz | H04J 3/0638 455/450 |
| 2015/0289216 | A1* | 10/2015 | Xing | H04W 56/001 455/422.1 |
| 2016/0150493 | A1* | 5/2016 | Ji | H04W 56/001 370/350 |
| 2016/0286507 | A1 | 9/2016 | Yang et al. | |
| 2016/0345334 | A1* | 11/2016 | Veerepalli | H04W 48/08 |
| 2017/0280406 | A1* | 9/2017 | Sheng | H04W 4/40 |
| 2017/0289935 | A1* | 10/2017 | Yoon | H04W 56/001 |
| 2018/0123849 | A1 | 5/2018 | Si et al. | |
| 2019/0207797 | A1* | 7/2019 | Zhang | H04L 27/00 |

FOREIGN PATENT DOCUMENTS

| | | |
|---|---|---|
| CN | 107547463 A | 1/2018 |
| CN | 108064435 A | 5/2018 |
| CN | 108322282 A | 7/2018 |
| CN | 108365910 A | 8/2018 |
| JP | 2017513271 A | 5/2017 |
| JP | 2019505128 A | 2/2019 |
| JP | 2019512899 A | 5/2019 |
| JP | 2021533683 A | 12/2021 |
| WO | 2018084636 A1 | 5/2018 |
| WO | 2020009553 A1 | 1/2020 |

OTHER PUBLICATIONS

3GPP TS 38.211 V15.1.0 (Mar. 2018), 3rd Generation Partnership Project; Technical Specification Group Radio Access Network; NR; Physical channels and modulation (Release 15), 90 pages.
3GPP TS 38.211 V15.2.0 (Jun. 2018), 3rd Generation Partnership Project; Technical Specification Group Radio Access Network; NR; Physical channels and modulation (Release 15), 96 pages.
LG Electronics, "NR SS sequence design", 3GPP TSG RAN WG1 Meeting #89, R1-1707587, Hangzhou, P.R. China, May 15-19, 2017, 11 pages.
3GPP TS 38.304 V15.0.0 (Jun. 2018), 3rd Generation Partnership Project; Technical Specification Group Radio Access Network; NR; User Equipment (UE) procedures in Idle mode and RRC Inactive state (Release 15), 25 pages.
3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.
ZTE, "Enhancement to sidelink synchronization", 3GPP TSG-RAN WG1 Meeting #83, R1-160684, St Julian's, Malta, Feb. 15-19, 2016, 13 pages.
Nokia et al., "Discussion on NR V2X Sidelink Synchronization", 3GPP TSG-RAN WG1 Ad-Hoc, Meeting #1901, R1-1901157, Taipei, Taiwan, Jan. 21-25, 2019, 12 pages.
Huawei et al., "Sidelink synchronization mechanisms for NR V2X", 3GPP TSG RAN WGI Meeting #99, R1-1911885, Reno, NV, USA, Nov. 18-22, 2019, 24 pages.

* cited by examiner

SYNCHRONIZATION SIGNAL TRANSMISSION METHOD AND APPARATUS

CROSS-REFERENCE TO RELATED APPLICATIONS

This application is a continuation of International Application No. PCT/CN2019/099724, filed on Aug. 8, 2019, which claims priority to Chinese Patent Application No. 201810911157.8, filed on Aug. 10, 2018. The disclosures of the aforementioned applications are hereby incorporated by reference in their entireties.

TECHNICAL FIELD

Embodiments of this application relate to the communications field, and in particular, to a synchronization signal transmission method and apparatus.

BACKGROUND

Device-to-device (D2D) communication, vehicle-to-vehicle (V2V) communication, vehicle-to-pedestrian (V2P) communication, or vehicle-to-infrastructure/network (V2I/N) communication is a technology of direct communication between terminal devices. V2V, V2P, and V2I/N are collectively referred to as V2X (V2X), that is to say, communication between a vehicle and everything.

A basic requirement in D2D or V2X communication is to implement synchronization between terminal devices that need to communicate. A synchronization signal between terminal devices may be interfered by a synchronization signal on a cellular link. In addition, a synchronization signal between D2D or V2X devices may also interfere with transmission of a synchronization signal on a cellular link. Consequently, synchronization performance between devices deteriorates.

SUMMARY

Embodiments of this application provide a synchronization signal transmitting and receiving method and apparatus, to improve synchronization performance between devices.

According to a first aspect, an embodiment of this application provides a synchronization signal transmitting method. A first device generates a first synchronization sequence and/or a second synchronization sequence, where the first synchronization sequence is different from any sequence of a third synchronization sequence set, and/or the second synchronization sequence is different from any sequence of a fourth synchronization sequence set; any sequence of the third synchronization sequence set satisfies:

$$d_3(n) = 1 - 2x(m)$$
$$m = (n + 43 \cdot N_{ID}^{(2)}) \bmod 127,$$
$$0 \le n < 127$$

where $x(i+7)=(x(i+4)+x(i)) \bmod 2$, $N_{ID}^{(2)} \in \{0,1,2\}$, and

[x(6) x(5) x(4) x(3) x(2) x(1) x(0)]=[1 1 1 0 1 1 0]; and any sequence of the fourth synchronization sequence set satisfies:

$$d_4(n) = d_4^1(n) \cdot d_4^2(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$$0 \le n < 127,$$

where $x_0(i+7)=(x_0(i+4)+x_0(i)) \bmod 2$, $x_1(i+7)=(x_1(i+1)+x_1(i)) \bmod 2$, $N_{ID}^{(2)} \in \{0,1,2\}$, $N_{ID}^{(1)} \in \{0,1,\ldots,335\}$, and

[$x_0$(6) $x_0$(5) $x_0$(4) $x_0$(3) $x_0$(2) $x_0$(1) $x_0$(0)]=[0 0 0 0 0 0 1][$x_1$(6) $x_1$(5) $x_1$(4) $x_1$(3) $x_1$(2) $x_1$(1) $x_1$(0)]=[0 0 0 0 0 0 1];

The first device transmits a first synchronization signal corresponding to the first synchronization sequence and/or a second synchronization signal corresponding to the second synchronization sequence.

A synchronization sequence obtained by using the method provided in this embodiment of this application can be different from any synchronization sequence of a synchronization sequence set in a 5G NR system, thereby effectively reducing interference between a synchronization signal of another source synchronization device and a synchronization signal on a Uu link in the NR system. In this way, synchronization performance between devices is improved.

In a possible design, that the first synchronization sequence is different from any sequence of a third synchronization sequence set includes: The first synchronization sequence is a cyclic shift of any sequence of the third synchronization sequence set; and/or a generator polynomial corresponding to the first synchronization sequence is different from a generator polynomial corresponding to any sequence of the third synchronization sequence set.

In a possible design, the first synchronization sequence satisfies $d_1(n)=1-2x(m')$, where $m'=(n+\Delta+43 N_{ID}^{(2)'}) \bmod 127$, $0 \le n < 127$, $N_{ID}^{(2)'} \in \{0,1,2\}$, and $\Delta$ is a non-zero integer.

Optionally, a value of $\Delta$ is greater than 0 and less than A.

Optionally, $\Delta = \lfloor 43/R \rfloor$ or $\Delta = \lceil 43/R \rceil$, where R is a positive integer, $\lfloor \ \rfloor$ represents rounding down, and $\lceil \ \rceil$ represents rounding up.

Optionally, $\Delta=21$ or $\Delta=22$.

Optionally, $\Delta$ is indicated by signaling, or $\Delta$ is predefined.

Optionally, the generator polynomial corresponding to the first synchronization sequence is $x(i+7)=(x(i+4)+x(i)) \bmod 2$, where $x(0)$ to $x(6)$ are initial values.

In a possible design, a generator polynomial corresponding to the first synchronization sequence is different from a generator polynomial corresponding to any sequence of the third synchronization sequence set includes: The generator polynomial corresponding to the first synchronization sequence is $$x(i+7) = \left(\sum_{n=0}^{6} K_n x(i+n)\right) \bmod 2,$$

where [$K_6,K_5,K_4,K_3,K_2,K_1,K_0$]≠[0,0,1,0,0,0,1] $K_n$ is an integer, and $x(0)$ to $x(6)$ are initial values.

In a possible design, the generator polynomial corresponding to the first synchronization sequence is $x(i+7)=(x(i+1)+x(i)) \bmod 2$.

In a possible design, the second synchronization sequence satisfies:

$d_2(n) = d_2^1(n) \cdot d_2^2(n) = [1-2x_0((n+m_0')\bmod 127)][1-2x_1((n+m_1')\bmod 127)]$, where $0 \leq n < 127$;

That the second synchronization sequence is different from any sequence of a fourth synchronization sequence set includes: The sequence $d_2^1(n)$ is a cyclic shift of the sequence $d_4^1(n)$, and/or the sequence $d_2^2(n)$ is a cyclic shift of the sequence $d_4^2(n)$; and/or a generator polynomial corresponding to the second synchronization sequence is different from generator polynomials corresponding to any sequence of the fourth synchronization sequence set.

In a possible design, the second synchronization sequence satisfies $$m_0' = 15\left\lfloor \frac{N_{ID}^{(1)}}{112} \right\rfloor + \Theta + 5N_{ID}^{(2)'}$$

and $m_1' = N_{ID}^{(1)'} \bmod 112$, where $N_{ID}^{(1)'} \in \{0,1,\ldots,335\}$, $N_{ID}^{(2)'} \in \{0,1,2\}$, and $\Theta$ is a non-zero integer.

Optionally, $\Theta \geq 45$, $\Theta$ is greater than zero and is not an integer multiple of 5, or $\Theta$ is greater than or equal to 45 and is an integer multiple of 5.

Optionally, $\Theta = 45$.

Optionally, $\Theta$ is indicated by signaling, or $\Theta$ is predefined.

In a possible design, the generator polynomial corresponding to the second synchronization sequence includes $x_0(i+7) = (x_0(i+3)+x_0(i))\bmod 2$, where $x_0(0)$ to $x_0(6)$ are initial values.

In a possible design, the generator polynomial corresponding to the second synchronization sequence includes: $x_1(i+7) = (x_i(i+3)+x_1(i+2)+x_1(i+1)+x_1(i))\bmod 2$, where $x_1(0)$ to $x_1(6)$ are initial values.

Optionally, generator polynomials corresponding to the second synchronization sequence are $x_0(i+7) = (x_0(i+4)+x_0(i))\bmod 2$ and $x_1(i+7) = (x_1(i+1)+x_1(i))\bmod 2$, where $x_0(0)$ to $x_0(6)$ are initial values, and $x_1(0)$ to $x_1(6)$ are initial values.

In a possible design, the method further includes: determining a synchronization signal identifier $N_{ID}$ from a synchronization signal identifier set; and determining a first identifier $N_{ID}^{(1)'}$ and/or a second identifier $N_{ID}^{(2)'}$ based on the synchronization signal identifier $N_{ID}$, where $N_{ID}^{(1)'} = N_{ID} \bmod 336$, and $N_{ID}^{(2)'} = \lfloor N_{ID}/336 \rfloor$.

In a possible design, the synchronization signal identifier set includes one or more subsets, and synchronization signal identifiers in the subsets indicate at least one of the following information: a timing reference of the first device is a network device; the timing reference of the first device is a second device that uses a network device as a timing parameter; the timing reference of the first device is a satellite; the timing reference of the first device is a second device that uses a satellite as a timing parameter; and the timing reference of the first device is the first device itself or a second device that is not synchronized with a network device or a satellite.

According to a second aspect, an embodiment of this application provides a synchronization signal receiving method, applied to a second device. The method includes: receiving a first synchronization signal corresponding to a first synchronization sequence and/or a second synchronization signal corresponding to a second synchronization sequence, where the first synchronization sequence is different from any sequence of a third synchronization sequence set, and/or the second synchronization sequence is different from any sequence of a fourth synchronization sequence set; any sequence of the third synchronization sequence set satisfies:

$$d_3(n) = 1 - 2x(m)$$
$$m = (n + 43 \cdot N_{ID}^{(2)}) \bmod 127,$$
$$0 \leq n < 127$$

where $x(i+7) = (x(i+4)+x(i))\bmod 2$, $N_{ID}^{(2)} \in \{0,1,2\}$, and
$[x(6)\ x(5)\ x(4)\ x(3)\ x(2)\ x(1)\ x(0)] = [1\ 1\ 1\ 0\ 1\ 1\ 0]$; and
any sequence of the fourth synchronization sequence set satisfies:

$$d_4(n) = \begin{array}{l} d_4^1(n) \cdot d_4^2(n) = \\ [1-2x_0((n+m_0)\bmod 127)][1-2x_1((n+m_1)\bmod 127)] \end{array}$$
$$m_0 = 15\left\lfloor \frac{N_{ID}^{(1)}}{112} \right\rfloor + 5N_{ID}^{(2)}$$
$$m_1 = N_{ID}^{(1)} \bmod 112$$
$$0 \leq n < 127$$

where $x_0(i+7) = (x_0(i+4)+x_0(i))\bmod 2$, $x_1(i+7) = (x_1(i+1)+x_1(i))\bmod 2$, $N_{ID}^{(2)} \in \{0,1,2\}$ $N_{ID}^{(1)} \in \{0,1,\ldots,335\}$,
$[x_0(6)\ x_0(5)\ x_0(4)\ x_0(3)\ x_0(2)\ x_0(1)\ x_0(0)] = [0\ 0\ 0\ 0\ 0\ 0\ 1]$, and
$[x_1(6)\ x_1(5)\ x_1(4)\ x_1(3)\ x_1(2)\ x_1(1)\ x_1(0)] = [0\ 0\ 0\ 0\ 0\ 0\ 1]$;
and obtaining a synchronization signal identifier $N_{ID}$ based on the first synchronization sequence and/or the second synchronization sequence.

In a possible design, the first synchronization sequence is different from any sequence of a third synchronization sequence set includes: The first synchronization sequence is a cyclic shift of any sequence of the third synchronization sequence set; and/or a generator polynomial corresponding to the first synchronization sequence is different from a generator polynomial corresponding to any sequence of the third synchronization sequence set.

In a possible design, the first synchronization sequence satisfies $d_1(n) = 1-2x(m')$, where $m' = (n+\Delta+43N_{ID}^{(2)'})\bmod 127$, $0 \leq n < 127$, $N_{ID}^{(2)'} \in \{0,1,2\}$, and $\Delta$ is a non-zero integer.

Optionally, a value of $\Delta$ is greater than 0 and less than 43.

Optionally, $\Delta = \lfloor 43/R \rfloor$ or $\Delta = \lceil 43/R \rceil$, where R is a positive integer, $\lfloor\ \rfloor$ represents rounding down, and $\lceil\ \rceil$ represents rounding up.

Optionally, $\Delta = 21$ or $\Delta = 22$.

Optionally, $\Delta$ is indicated by signaling, or $\Delta$ is predefined.

In a possible design, the generator polynomial corresponding to the first synchronization sequence is $x(i+7) = (x(i+4)+x(i))\bmod 2$, where $x(0)$ to $x(6)$ are initial values.

In a possible design, a generator polynomial corresponding to the first synchronization sequence is different from a generator polynomial corresponding to any sequence of the third synchronization sequence set includes: The generator polynomial corresponding to the first synchronization sequence is $$x(i+7) = \left(\sum_{n=0}^{6} K_n x(i+n)\right) \bmod 2,$$

where $[K_6,K_5,K_4,K_3,K_2,K_1,K_0] \neq [0,0,1,0,0,0,1]$, $K_n$ is an integer, and x(0) to x(6) are initial values.

In a possible design, the generator polynomial corresponding to the first synchronization sequence is $x(i+7)=(x(i+1)+x(i))\mod 2$.

In a possible design, the second synchronization sequence satisfies:
$d_2(n)=d_2^1(n) \cdot d_2^2(n) = [1-2x_0((n+m_0')\mod 127)][1-2x_1((n+m_1')\mod 127)]$, where $0 \leq n < 127$;

That the second synchronization sequence is different from any sequence of a fourth synchronization sequence set includes:

The sequence $d_2^1(n)$ is a cyclic shift of the sequence $d_4^1(n)$, and/or the sequence $d_2^2(n)$ is a cyclic shift of the sequence $d_4^2(n)$; and/or a generator polynomial corresponding to the second synchronization sequence is different from generator polynomials corresponding to any sequence of the fourth synchronization sequence set.

In a possible design, the second synchronization sequence satisfies $$m_0' = 15 \left\lfloor \frac{N_{ID}^{(1)}}{112} \right\rfloor + \Theta + 5N_{ID}^{(2)'}$$

and $m_1' = N_{ID}^{(1)'} \mod 112$, where $N_{ID}^{(1)'} \in \{0,1,\ldots,335\}$, $N_{ID}^{(2)'} \in \{0,1,2\}$, and $\Theta$ is a non-zero integer.

Optionally, $\Theta \geq 45$, $\Theta$ is greater than zero and is not an integer multiple of 5, or $\Theta$ is greater than or equal to 45 and is an integer multiple of 5.

Optionally, $\Theta = 45$.

Optionally, $\Theta$ is indicated by signaling, or $\Theta$ is predefined.

In a possible design, a generator polynomial corresponding to the second synchronization sequence is different from generator polynomials corresponding to any sequence of the fourth synchronization sequence set includes: The generator polynomial corresponding to the second synchronization sequence includes
$x_0(i+7)=(x_0(i+3)+x_0(i))\mod 2$, where $x_0(0)$ to $x_0(6)$ are initial values.

In a possible design, that a generator polynomial corresponding to the second synchronization sequence is different from generator polynomials corresponding to any sequence of the fourth synchronization sequence set includes: The generator polynomial corresponding to the second synchronization sequence includes
$x_1(i+7)=(x_1(i+3)+x_1(i+2)+x_1(i+1)+x_1(i))\mod 2$, where $x_1(0)$ to $x_1(6)$ are initial values.

In a possible design, generator polynomials corresponding to the second synchronization sequence are $x_0(i+7)=(x_0(i+4)+x_0(i))\mod 2$ and $x_1(i+7)=(x_i(i+1)+x_1(i))\mod 2$, where $x_0(0)$ to $x_0(6)$ are initial values, and $x_1(0)$ to $x_1(6)$ are initial values.

In a possible design, the method further includes: determining a timing reference source of the first device based on the synchronization signal identifier $N_{ID}$.

In a possible design, the obtaining a synchronization signal identifier $N_{ID}$ based on the first synchronization information and/or the second synchronization information includes: determining a first identifier $N_{ID}^{(1)'}$ and/or a second identifier $N_{ID}^{(2)'}$ based on the first synchronization signal and/or the second synchronization signal; and determining the synchronization signal identifier $N_{ID}$ based on the first identifier $N_{ID}^{(1)'}$ and/or the second identifier $N_{ID}^{(2)'}$, where $N_{ID} = 2N_{ID}^{(1)'} + N_{ID}^{(2)'}$ or $N_{ID} = 3N_{ID}^{(1)'} + N_{ID}^{(2)'}$.

According to a third aspect, an embodiment of the present invention provides a synchronization signal transmitting apparatus. The apparatus includes a processor, and a memory and a transceiver that are coupled to the processor; Wherein, the processor is configured to generate a first synchronization sequence and/or a second synchronization sequence, where the first synchronization sequence is different from any sequence of a third synchronization sequence set, and/or the second synchronization sequence is different from any sequence of a fourth synchronization sequence set; any sequence of the third synchronization sequence set satisfies:

$$d_3(n) = 1 - 2x(m)$$
$$m = (n + 43 \cdot N_{ID}^{(2)}) \mod 127,$$
$$0 \leq n < 127$$

where
$x(i+7)=(x(i+4)+x(i))\mod 2$, $N_{ID}^{(2)} \in \{0,1,2\}$, and
$[x(6)\ x(5)\ x(4)\ x(3)\ x(2)\ x(1)\ x(0)] = [1\ 1\ 1\ 0\ 1\ 1\ 0]$; and any sequence of the fourth synchronization sequence set satisfies:

$$d_4(n) = \begin{array}{l} d_4^1(n) \cdot d_4^2(n) = \\ [1 - 2x_0((n+m_0) \mod 127)][1 - 2x_1((n+m_1) \mod 127)] \end{array}$$

$$m_0 = 15 \left\lfloor \frac{N_{ID}^{(1)}}{112} \right\rfloor + 5N_{ID}^{(2)}$$

$$m_1 = N_{ID}^{(1)} \mod 112$$

$0 \leq n < 127$, where
$x_0(i+7)=(x_0(i+4)+x_0(i))\mod 2$, $x_i(i+7)=(x_1(i+1)+x_1(i))\mod 2$, $N_{ID}^{(2)} \in \{0,1,2\}$ $N_{ID}^{(1)} \in \{0,1,\ldots,335\}$, and
$[x_0(6)\ x_0(5)\ x_0(4)\ x_0(3)\ x_0(2)\ x_0(1)\ x_0(0)] = [0\ 0\ 0\ 0\ 0\ 0\ 1]$,
$[x_1(6)\ x_1(5)\ x_1(4)\ x_1(3)\ x_1(2)\ x_1(1)\ x_1(0)] = [0\ 0\ 0\ 0\ 0\ 0\ 1]$;

The transceiver is configured to transmit a first synchronization signal corresponding to the first synchronization sequence and/or a second synchronization signal corresponding to the second synchronization sequence.

In a possible design, the first synchronization sequence is different from any sequence of a third synchronization sequence set includes: The first synchronization sequence is a cyclic shift of any sequence of the third synchronization sequence set; and/or a generator polynomial corresponding to the first synchronization sequence is different from a generator polynomial corresponding to any sequence of the third synchronization sequence set.

In a possible design, the first synchronization sequence satisfies $d_1(n) = 1 - 2x(m')$, where $m' = (n + \Delta + 43N_{ID}^{(2)'}) \mod 127$, $0 \leq n < 127$, $N_{ID}^{(2)'} \in \{0,1,2\}$, and $\Delta$ is a non-zero integer.

Optionally, a value of $\Delta$ is greater than 0 and less than A.

Optionally, $\Delta = \lfloor 43/R \rfloor$ or $\Delta = \lceil 43/R \rceil$, where R is a positive integer, $\lfloor\ \rfloor$ represents rounding down, and $\lceil\ \rceil$ represents rounding up.

Optionally, $\Delta = 21$ or $\Delta = 22$.

Optionally, $\Delta$ is indicated by signaling, or $\Delta$ is predefined.

In a possible design, the generator polynomial corresponding to the first synchronization sequence is $x(i+7)=(x(i+4)+x(i))\mod 2$, where $x(0)$ to $x(6)$ are initial values.

In a possible design, that a generator polynomial corresponding to the first synchronization sequence is different from a generator polynomial corresponding to any sequence of the third synchronization sequence set includes: The generator polynomial corresponding to the first synchronization sequence is $$x(i+7) = \left(\sum_{n=0}^{6} K_n x(i+n)\right) \mod 2,$$

where $[K_6,K_5,K_4,K_3,K_2,K_1,K_0] \neq [0,0,1,0,0,0,1]$, $K_n$ is an integer, and $x(0)$ to $x(6)$ are initial values.

In a possible design, the generator polynomial corresponding to the first synchronization sequence is $x(i+7)=(x(i+1)+x(i))\mod 2$.

In a possible design, the second synchronization sequence satisfies:
$d_2(n)=d_2^1(n) \cdot d_2^2(n)=[1-2x_0((n+m_0') \mod 127)][1-2x_1((n+m_1') \mod 127)]$, where $0 \leq n < 127$;

That the second synchronization sequence is different from any sequence of a fourth synchronization sequence set includes:

The sequence $d_2^1(n)$ is a cyclic shift of the sequence $d_4^1(n)$, and/or the sequence $d_2^2(n)$ is a cyclic shift of the sequence $d_4^2(n)$; and/or a generator polynomial corresponding to the second synchronization sequence is different from generator polynomials corresponding to any sequence of the fourth synchronization sequence set.

In a possible design, the second synchronization sequence satisfies $$m_0' = 15\left\lfloor\frac{N_{ID}^{(1)}}{112}\right\rfloor + \Theta + 5N_{ID}^{(2)'}$$

and $m_1'=N_{ID}^{(1)'} \mod 112$, where $N_{ID}^{(1)'} \in \{0,1,\ldots,335\}$, $N_{ID}^{(2)'} \in \{0,1,2\}$, and $\Theta$ is a non-zero integer.

Optionally, $\Theta \geq 45$, $\Theta$ is greater than zero and is not an integer multiple of 5, or $\Theta$ is greater than or equal to 45 and is an integer multiple of 5.

Optionally, $\Theta=45$.

Optionally, $\Theta$ is indicated by signaling, or $\Theta$ is predefined.

In a possible design, that a generator polynomial corresponding to the second synchronization sequence is different from generator polynomials corresponding to any sequence of the fourth synchronization sequence set includes: The generator polynomial corresponding to the second synchronization sequence includes $x_0(i+7)=(x_0(i+3)+x_0(i))\mod 2$, where $x_0(0)$ to $x_0(6)$ are initial values.

In a possible design, that a generator polynomial corresponding to the second synchronization sequence is different from generator polynomials corresponding to any sequence of the fourth synchronization sequence set includes: The generator polynomial corresponding to the second synchronization sequence includes:
$x_1(i+7)=(x_1(i+3)+x_1(i+2)+x_1(i+1)+x_1(i))\mod 2$, where $x_1(0)$ to $x_1(6)$ are initial values.

In a possible design, generator polynomials corresponding to the second synchronization sequence are $x_0(i+7)=(x_0(i+4)+x_0(i))\mod 2$ and $x_1(i+7)=(x_1(i+1)+x_1(i))\mod 2$, where $x_0(0)$ to $x_0(6)$ are initial values, and $x_1(0)$ to $x_1(6)$ are initial values.

In a possible design, the processor is further configured to determine a synchronization signal identifier $N_{ID}$ from a synchronization signal identifier set. The processor is further configured to determine a first identifier $N_{ID}^{(1)'}$ and/or a second identifier $N_{ID}^{(2)'}$ based on the synchronization signal identifier $N_{ID}$, where $N_{ID}^{(1)'}=N_{ID}^{(1)'} \mod 336$, and $N_{ID}^{(2)'}=\lfloor N_{ID}/336 \rfloor$.

In a possible design, the synchronization signal identifier set includes one or more subsets, and synchronization signal identifiers in the subsets indicate at least one of the following information: timing reference of the first device is a network device; the timing reference of the first device is a second device that uses a network device as a timing parameter; the timing reference of the first device is a satellite; the timing reference of the first device is a second device that uses a satellite as a timing parameter; and the timing reference of the first device is the first device itself or a second device that is not synchronized with a network device or a satellite.

According to a fourth aspect, an embodiment of the present invention provides a synchronization signal receiving apparatus. The apparatus includes a processor, and a memory and a transceiver that are coupled to the processor;

The transceiver is configured to receive a first synchronization signal corresponding to a first synchronization sequence and/or a second synchronization signal corresponding to a second synchronization sequence, where the first synchronization sequence is different from any sequence of a third synchronization sequence set, and/or the second synchronization sequence is different from any sequence of a fourth synchronization sequence set; any sequence of the third synchronization sequence set satisfies:

$$d_3(n) = 1 - 2x(m)$$
$$m = (n + 43 \cdot N_{ID}^{(2)}) \mod 127,$$
$$0 \leq n < 127$$

where
$x(i+7)=(x(i+4)+x(i))\mod 2$, $N_{ID}^{(2)} \in \{0,1,2\}$, and
$[x(6)\ x(5)\ x(4)\ x(3)\ x(2)\ x(1)\ x(0)]=[1\ 1\ 1\ 0\ 1\ 1\ 0]$; and any sequence of the fourth synchronization sequence set satisfies:

$$d_4(n) = \begin{array}{l} d_4^1(n) \cdot d_4^2(n) = \\ [1 - 2x_0((n+m_0)\mod 127)][1 - 2x_1((n+m_1)\mod 127)] \end{array}$$
$$m_0 = 15\left\lfloor\frac{N_{ID}^{(1)}}{112}\right\rfloor + 5N_{ID}^{(2)}$$
$$m_1 = N_{ID}^{(1)} \mod 112$$
$$0 \leq n < 127$$

where
$x_0(i+7)=(x_0(i+4)+x_0(i))\mod 2$, $x_1(i+7)=(x_1(i+1)+x_1(i))\mod 2$, $N_{ID}^{(2)} \in \{0,1,2\}$, $N_{ID}^{(1)} \in \{0,1,\ldots,335\}$, and
$[x_0(6)\ x_0(5)\ x_0(4)\ x_0(3)\ x_0(2)\ x_0(1)\ x_0(0)]=[0\ 0\ 0\ 0\ 0\ 0\ 1]$,
$[x_1(6)\ x_1(5)\ x_1(4)\ x_1(3)\ x_1(2)\ x_1(1)\ x_1(0)]=[0\ 0\ 0\ 0\ 0\ 0\ 1]$;

The processor is configured to obtain a synchronization signal identifier $N_{ID}$, based on the first synchronization sequence and/or the second synchronization sequence.

In a possible design, the first synchronization sequence is different from any sequence of a third synchronization sequence set includes: The first synchronization sequence is a cyclic shift of any sequence of the third synchronization sequence set; and/or a generator polynomial corresponding to the first synchronization sequence is different from a generator polynomial corresponding to any sequence of the third synchronization sequence set.

In a possible design, the first synchronization sequence satisfies $d_1(n)=1-2x(m')$, where $m'=(n+\Delta+43N_{ID}^{(2)'})\mod 127$, $0 \leq n < 127$, $N_{ID}^{(2)'} \in \{0,1,2\}$, and $\Delta$ is a non-zero integer.

Optionally, a value of Δ is greater than 0 and less than 43.

Optionally, Δ=⌊43/R⌋ or Δ=⌈43/R⌉, where R is a positive integer, ⌊ ⌋ represents rounding down, and ⌈ ⌉ represents rounding up.

Optionally, Δ=21 or Δ=22.

Optionally, Δ is indicated by signaling, or Δ is predefined.

In a possible design, the generator polynomial corresponding to the first synchronization sequence is x(i+7)=(x(i+4)+x(i))mod 2, where x(0) to x(6) are initial values.

In a possible design, a generator polynomial corresponding to the first synchronization sequence is different from a generator polynomial corresponding to any sequence of the third synchronization sequence set includes: The generator polynomial corresponding to the first synchronization sequence is $$x(i+7) = \left(\sum_{n=0}^{6} K_n x(i+n)\right) \bmod 2,$$

$[K_6, K_5, K_4, K_3, K_2, K_1, K_0] \neq [0,0,1,0,0,0,1]$ $K_n$ is an integer, and x(0) to x(6) are initial values.

In a possible design, the generator polynomial corresponding to the first synchronization sequence is x(i+7)=(x(i+1)+x(i))mod 2.

In a possible design, the second synchronization sequence satisfies:

$d_2(n) = d_2^1(n) \cdot d_2^2(n) = [1-2x_0((n+m_0')\bmod 127)][1-2x_1((n+m_1')\bmod 127)]$, where 0≤n<127;

That the second synchronization sequence is different from any sequence of a fourth synchronization sequence set includes:

The sequence $d_2^1(n)$ is a cyclic shift of the sequence $d_4^1(n)$, and/or the sequence $d_2^2(n)$ is a cyclic shift of the sequence $d_4^2(n)$; and/or a generator polynomial corresponding to the second synchronization sequence is different from generator polynomials corresponding to any sequence of the fourth synchronization sequence set.

In a possible design, the second synchronization sequence satisfies $$m_0' = 15 \left\lfloor \frac{N_{ID}^{(1)}}{112} \right\rfloor + \Theta + 5 N_{ID}^{(2)'}$$

and $m_1' = N_{ID}^{(1)'}$ mod 112, where $N_{ID}^{(1)'} \in 0,1, \ldots, 335$, $N_{ID}^{(2)'} \in \{0,1,2\}$, and $\Theta$ is a non-zero integer.

Optionally, Θ≥45, Θ is greater than zero and is not an integer multiple of 5, or Θ is greater than or equal to 45 and is an integer multiple of 5.

Optionally, Θ=45.

Optionally, ∂ is indicated by signaling, or Θ is predefined.

In a possible design, a generator polynomial corresponding to the second synchronization sequence is different from generator polynomials corresponding to any sequence of the fourth synchronization sequence set includes: The generator polynomial corresponding to the second synchronization sequence includes $x_0(i+7)=(x_0(i+3)+x_0(i))$mod 2, where $x_0(0)$ to $x_0(6)$ are initial values.

In a possible design, a generator polynomial corresponding to the second synchronization sequence is different from generator polynomials corresponding to any sequence of the fourth synchronization sequence set includes the following. The generator polynomial corresponding to the second synchronization sequence includes:

$x_1(i+7)=(x_1(i+3)+x_1(i+2)+x_1(i+1)+x_1(i))$mod 2, where x1(0) to $x_1(6)$ are initial values.

In a possible design, generator polynomials corresponding to the second synchronization sequence are $x_0(i+7)=(x_0(i+4)+x_0(i))$mod 2 and $x_1(i+7)=(x_1(i+1)+x_1(i))$mod 2, where $x_0(0)$ to $x_0(6)$ are initial values, and $x_1(0)$ to $x_1(6)$ are initial values.

In a possible design, the processor is further configured to determine a timing reference source of the first device based on the synchronization signal identifier $N_{ID}$.

In a possible design, the processor is configured to obtain a synchronization signal identifier $N_{ID}$ based on the first synchronization information and/or the second synchronization information includes the following. The processor is configured to determine a first identifier $N_{ID}^{(1)'}$ and/or a second identifier $N_{ID}^{(2)'}$ based on the first synchronization signal and/or the second synchronization signal. The processor is configured to determine the synchronization signal identifier $N_{ID}$ based on the first identifier $N_{ID}^{(1)'}$ and/or the second identifier $N_{ID}^{(2)'}$, where $N_{ID}=2N_{ID}^{(1)'}+N_{ID}^{(2)'}$ or $N_{ID}=3N_{ID}^{(1)'}+N_{ID}^{(2)'}$.

In the foregoing aspects, the first device may be a terminal device, a network device, or an apparatus that is in a terminal device or a network device and that performs the foregoing method.

In the foregoing aspects, the second device may be a terminal device, a network device, or an apparatus that is in a terminal device or a network device and that performs the foregoing method.

According to a fifth aspect, a communications apparatus is provided. The communications apparatus is configured to perform functions of behavior of the first device or the second device in the foregoing method. The functions may be implemented by hardware, or may be implemented by hardware executing corresponding software. The hardware or the software includes one or more units corresponding to the foregoing functions.

According to a sixth aspect, a computer storage medium including an instruction is provided. When the instruction is run on a computer, the computer is enabled to perform functions of behavior of the first device or the second device in the foregoing method designs.

DETAILED DESCRIPTION OF ILLUSTRATIVE EMBODIMENTS

Figure 1:
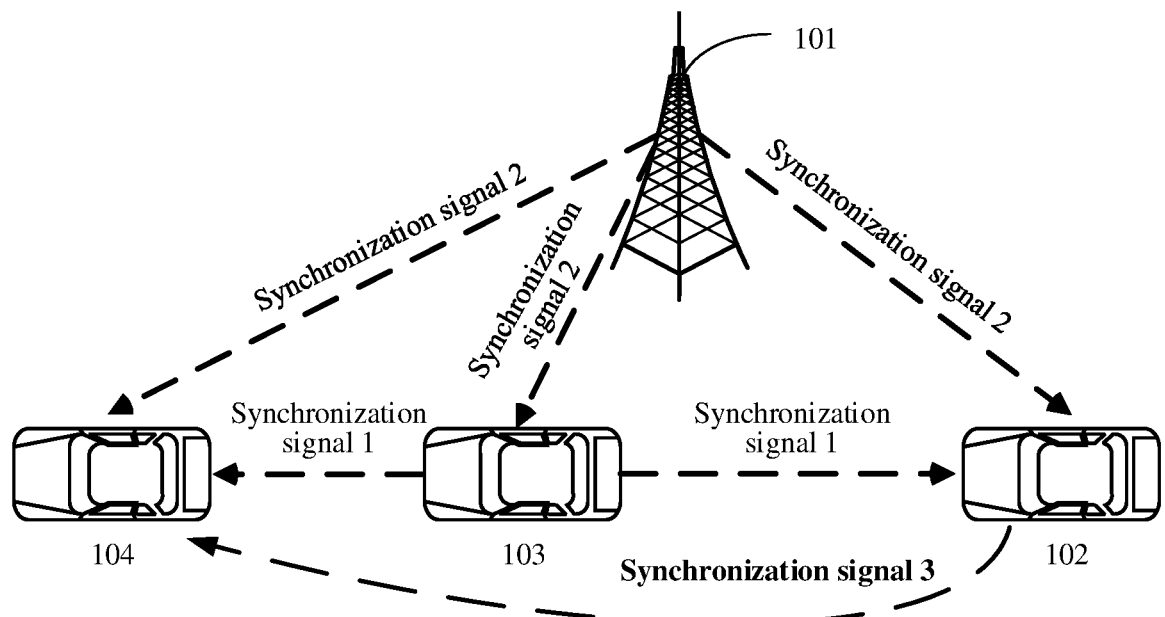
FIG. 1 is a schematic architecture diagram of a wireless communications system according to an embodiment of this application.

The following describes technical solutions in embodiments of the present invention with reference to the accompanying drawings in the embodiments of the present invention. It should be noted that the technical solutions or features in the embodiments of the present invention may be mutually combined when no conflict occurs.

In the embodiments of the present invention, "one" means a single individual, and does not indicate that "one" can only be one individual and cannot be applied to another individual. For example, in the embodiments of the present invention, "one terminal device" refers to a terminal device, and this does not mean that "one terminal device" can be applied only to one particular terminal device. The terms "system" and "network" may be used interchangeably in this application.

A reference to "an embodiment" (or "an implementation") or "embodiments" (or "implementations") in this application means that a specific feature, a structure, a feature, and the like that are described with the embodiments are included in at least one embodiment. Therefore, "in an embodiment" or "in the embodiments" that appears throughout this specification does not represent a same embodiment. In the embodiments of the present invention, "one" means a single individual, and does not indicate that "one" can only be one individual and cannot be applied to another individual. For example, in the embodiments of the present invention, "one terminal device" refers to a terminal device, and this does not mean that "one terminal device" can be applied only to one particular terminal device. The terms "system" and "network" may be used interchangeably in this application.

A reference to "an embodiment" (or "an implementation") or "embodiments" (or "implementations") in this application means that a specific feature, a structure, a feature, and the like that are described with the embodiments are included in at least one embodiment. Therefore, "in an embodiment" or "in the embodiments" that appears throughout this specification does not represent a same embodiment.

Further, in the embodiments of the present invention, the terms "and/or" and "at least one" used in cases of "A and/or B" and "at least one of A and B" include any one of three scenarios: a scenario in which A is included but B is excluded, a scenario in which B is included but A is excluded, and a scenario in which both options A and B are included. For another example, in a case of "A, B, and/or C" and "at least one of A, B, and/or C", this phrase includes any one of six scenarios: a scenario in which A is included but both B and C are excluded, a scenario in which B is included but both A and C are excluded, a scenario in which C is included but both A and B are excluded, a scenario in which both A and B are included but C is excluded, a scenario in which both B and C are included but A is excluded, a scenario in which both A and C are included but B is excluded, and a scenario in which three options A, B, and C are included. As easily understood by a person of ordinary skill in the art and a related art, all other similar descriptions can be understood in the foregoing manner in the embodiments of the present invention.

In a general wireless communications system, to establish a link for communication between communications devices, synchronization needs to be implemented first. A synchronization process generally includes: A source synchronization device transmits a synchronization signal, and a device that needs to be synchronized receives and decodes the synchronization signal, to implement synchronization to the source synchronization device. The wireless communications system may be a system that applies various radio access technologies (RAT), for example, code division multiple access (CDMA), time division multiple access (TDMA), frequency division multiple access (FDMA), orthogonal frequency division multiple access (OFDMA), single-carrier frequency division multiple access (SC-FDMA), or another system. For example, the wireless communications system may be a long term evolution (LTE) system, a CDMA system, a wideband code division multiple access (WCDMA) system, a global system for mobile communications (GSM) system, a wireless local area network (WLAN) system, a 5th generation (5G) new radio (NR) system, various evolved or converged systems, or a future-oriented communications technology system. When there are a plurality of wireless communications systems in space, or when a same communications system includes a plurality of different source synchronization devices, different synchronization signals may interfere with each other. FIG. 1 shows a possible scenario. In this scenario, there is one network device 101 and three terminal devices 102, 103, and 104. The network device 101 and the terminal device 103 are two different source synchronization devices in a same wireless communications system. For example, in a possible scenario, the network device 101 may be a base station in a cellular network, and the terminal devices 102, 103, and 104 may be vehicle-mounted wireless communications devices, mobile phones, or the like. The terminal devices 102, 103, and 104 may perform wireless communication with the base station, and the communication devices 102, 103, and 104 may also perform direct communication with each other. In FIG. 1, the network device 101 transmits a synchronization signal 2 to the terminal devices 102, 103, and 104, and the terminal device 103 transmits a synchronization signal 1 to the terminal devices 102 and 104. The terminal devices 102 and 104 need to perform blind detection on both the synchronization signal 1 and/or the synchronization signal 2. If a synchronization sequence 1 used for the synchronization signal 1 and a synchronization sequence 2 used for the synchronization signal 2 are the same or are highly correlated, the terminal devices 102 and 104 may be unable to distinguish between the synchronization signal 1 and the synchronization signal 2. That is, the synchronization signal 1 and the synchronization signal 2 interfere with each other. In addition, establishing a connection between each of the terminal devices 102, 103 and 104 and the network device 101 and establishing a direct connection between each of the terminal devices 102 and 104 and the terminal device 103 may be affected. Further, in a same wireless communications system, synchronization signals of different source synchronization devices that support different services may also interfere with each other, and a synchronization signal of a source synchronization device that supports another service (other than a Uu link) and a synchronization signal on a cellular link may also interfere with each other. As shown in FIG. 1, the terminal device 102 transmits a synchronization signal 3. The synchronization signal 1 and the synchronization signal 3 may be used for different transmission modes on links between different devices. For example, the synchronization signal 1 is used for a transmission mode 1, the transmission mode 1 is used for an eMBB service, the synchronization signal 3 is used for a transmission mode 3, and the transmission mode 3 is used for a V2X security service related to intelligent transportation. Timing references between the terminal devices may be different. In this case, potential mutual interference between the synchronization signal 1 and the synchronization signal 2 also needs to be avoided. Similarly, mutual interference between the three types of signals, namely, the synchronization signal 1, the synchronization signal 2, and the synchronization signal 3, also needs to be avoided as much as possible. Therefore, the embodiments of this application provide a solution that can improve synchronization performance between devices. It should be understood that the scenario shown in FIG. 1 is merely an example, and is not intended to limit the solutions of this application.

The network device mentioned in the embodiments of this application is an apparatus that is deployed in a radio access network and that is configured to provide a wireless communication function for a terminal device. The network device may be a base station (BS), such as a macro base station, a micro base station, a relay station, or an access point, or may be a device in another form, such as a street lamp or a road side unit (RSU). In systems using different radio access technologies, names of devices having a network device function may be different. For example, the network device is a network device or a base station in a 5th generation 5G network. In a long term evolution (LTE) network, the network device is referred to as an evolved NodeB (evolved NodeB, eNB or eNodeB for short). In a third generation (3G) network, the network device is referred to as a NodeB or the like. Alternatively, the network device is a road side unit (RSU) in V2V communication, or a chip or a system on chip (SOC) in the foregoing network device or base station. For ease of description, in this application, the foregoing apparatuses that provide the wireless communication function for the terminal device are collectively referred to as the network device.

The terminal device mentioned in this application may include various handheld devices, vehicle-mounted devices, wearable devices, and computing devices that have a wireless communication function, or other processing devices connected to a wireless modem, or may be a unit, a component, an apparatus, a chip, or an SOC in the foregoing devices. The terminal device may be referred to as a wireless communications device, or may be referred to as a mobile station (MS), a terminal, user equipment (UE), or the like. The terminal device may include a subscriber unit, a cellular phone, a smartphone, a wireless data card, a personal digital assistant (PDA) computer, a tablet computer, a modem or a modem processor, a handheld device, a laptop computer, a netbook, a cordless phone, a wireless local loop (WLL) station, a Bluetooth device, a machine type communication (MTC) terminal, and the like. For ease of description, in this application, these are referred to as the terminal device or the UE for short.

The terminal device may support one or more wireless technologies used for wireless communication, for example, 5G, LTE, WCDMA, CDMA, 1×, time division-synchronous code division multiple access (TS-SCDMA), and GSM, 802.11. The terminal device may also support different transmission services such as a vehicle to everything (V2X) service and a device to device (D2D) service, or different transmission modes on a cellular link or on a sidelink between terminal devices, and may further support different technical features on a cellular link, such as the internet of things (IoT) and machine type communication (MTC).

A plurality of terminal devices may perform a same service or different services, such as a mobile broadband service, an enhanced mobile broadband (eMBB) service, and an ultra-reliable low-latency communication (URLLC) service.

Figure 2:
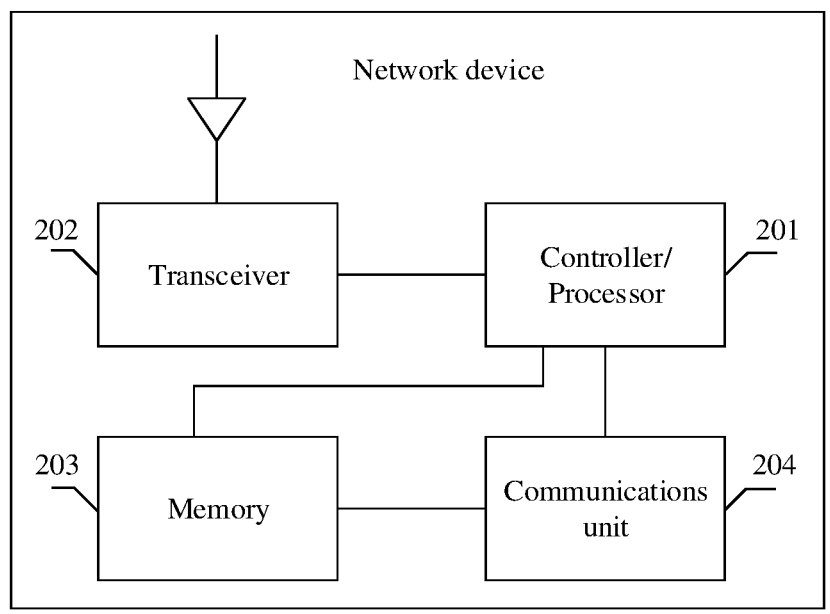
FIG. 2 is a possible schematic structural diagram of a network device according to an embodiment of this application.

Further, a possible schematic structural diagram of the foregoing network device 101 may be FIG. 2. The network device 101 can perform the method provided in the embodiments of the present application. The network device 101 may include a controller or processor 201 (the following uses the processor 201 as an example for description) and a transceiver 202. The controller/processor 201 is sometimes also referred to as a modem processor (modem processor).

The modem processor 201 may include a baseband processor (BBP) (not shown). The baseband processor processes a received digitized signal, to extract information or a data bit transferred in the signal. Therefore, according to a requirement or an expectation, the BBP is usually implemented in one or more digital signal processors (DSP) in the modem processor 201 or implemented as separated integrated circuits (IC).

The transceiver 202 may be configured to support transmitting and receiving of information between the network device 101 and a terminal device, and support wireless communication between terminal devices. The processor 201 may be further configured to perform functions of communication between various terminal devices and another network device. On an uplink, an uplink signal from the terminal device is received by using an antenna, demodulated by the transceiver 202, and further processed by the processor 201, to restore service data and/or signaling information transmitted by the terminal device. On a downlink, service data and/or a signaling message are/is processed by the terminal device and modulated by the transceiver 202 to generate a downlink signal, and the downlink signal is transmitted to the terminal device by using an antenna. The network device 101 may further include a memory 203, and the memory may be configured to store program code and/or data of the network device 101. The transceiver 202 may include an independent receiver circuit and an independent transmitter circuit, or may be a circuit implementing transmitting and receiving functions. The network device 101 may further include a communications unit 204, configured to support communication between the network device 201 and another network entity. For example, the communications unit 204 is configured to support communication between the network device 101 and a network device or the like of a core network.

Optionally, the network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
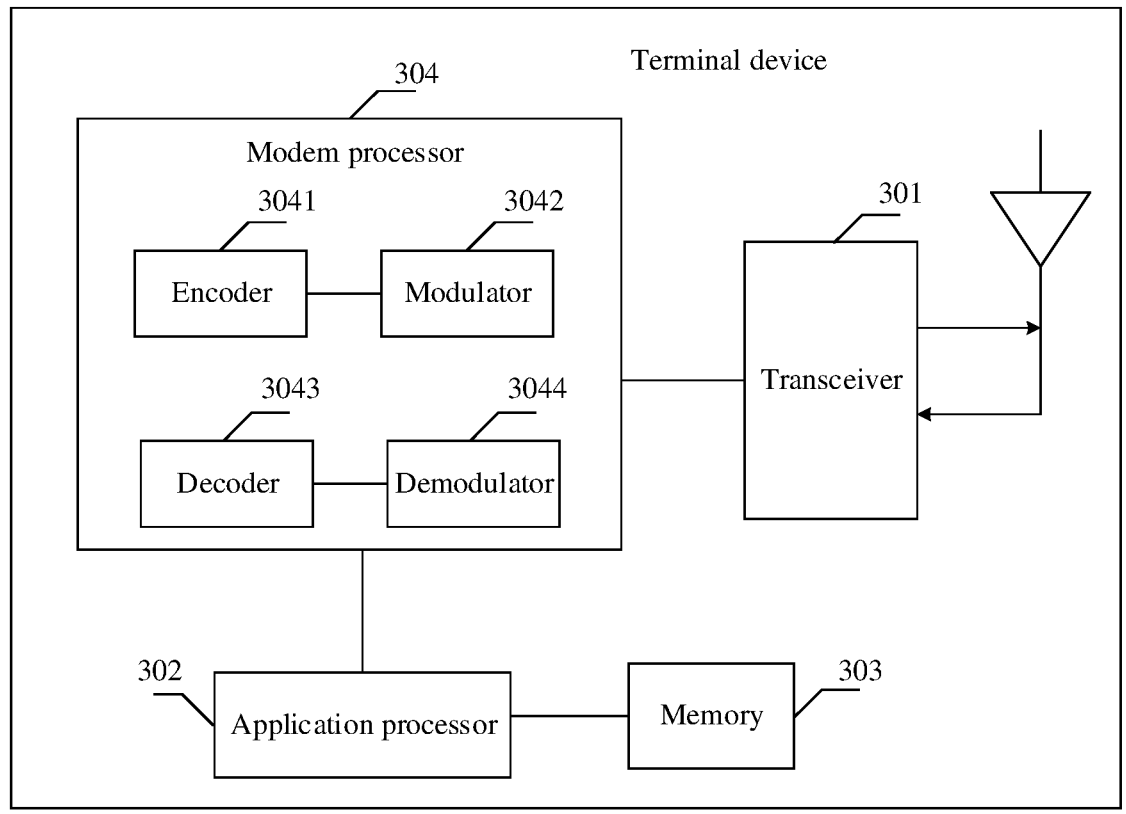
FIG. 3 is a possible schematic structural diagram of a terminal device according to an embodiment of this application.

FIG. 3 is a possible schematic structural diagram of the terminal device in the foregoing wireless communications system. The terminal device can perform the method provided in the embodiments of the present invention. The terminal device may be any one of the three terminal devices 102 to 104. The terminal device includes a transceiver 301, an application processor 302, a memory 303, and a modem processor 304.

The transceiver 301 may adjust (for example, perform analog conversion, filtering, amplification, and up-conversion on) an output sample and generate an uplink signal. The uplink signal is transmitted to the base station in the foregoing embodiment by using an antenna. On a downlink, the antenna receives a downlink signal transmitted by the network device. The transceiver 301 may adjust (for example, perform filtering, amplification, down-conversion, and digitalization on) a signal received from the antenna and provide an input sample.

The modem processor 304 is sometimes also referred to as a controller or a processor, and may include a baseband processor (BBP) (not shown). The baseband processor processes a received digitized signal, to extract information or a data bit transferred in the signal. According to a requirement or an expectation, the BBP is usually implemented in one or more DSPs in the modem processor 304 or implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message to be sent on an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and may provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. The units perform processing by using a radio access technology used in a radio access network.

The modem processor 304 receives, from the application processor 302, digitized data that may represent voice, data, or control information, and processes the digitized data for transmission. The modem processor may support one or more of a plurality of wireless communication protocols of a plurality of communications systems, such as LTE, new radio, universal mobile telecommunications system (UMTS), and high speed packet access (HSPA). Optionally, the modem processor 304 may further include one or more memories.

Optionally, the modem processor 304 and the application processor 302 may be integrated in one processor chip.

The memory 303 is configured to store program code (sometimes referred to as a program, an instruction, software, or the like) and/or data that are/is used to support the terminal device in communication.

It should be noted that, the memory 203 or the memory 303 may include one or more storage units. For example, the storage unit may be a storage unit that is in the processor 201, the modem processor 304, or the application processor 302 and that is used to store program code, may be an external storage unit independent of the processor 201, the modem processor 304, or the application processor 302, or may be a component including a storage unit in the processor 201, the modem processor 304, or the application processor 302 and an external storage unit independent of the processor 201, the modem processor 304, or the application processor 302.

The processor 201 and the modem processor 301 may be processors of a same type, or may be processors of different types. For example, the processor 201 and modem processor 301 each may be implemented as a central processing unit (CPU), a general-purpose processor, a digital signal processor (DSP), an application-specific integrated circuit (ASIC), a field programmable gate array (FPGA), another programmable logic device, a transistor logic device, a hardware component, another integrated circuit, or any combination thereof. The processor 201 and the modem processor 301 may implement or execute examples of various logical blocks, modules, and circuits described with reference to content disclosed in the embodiments of the present invention. The processor may be a combination of components implementing computing functions, for example, a combination of one or more microprocessors, a combination of a DSP and a microprocessor, or a system on a chip (SOC).

A person skilled in the art can understand that various explanatory logic blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. As an example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

In a downlink synchronization process of a cellular network service in an NR system, a synchronization signal transmitted by a network device includes a primary synchronization signal (PSS) and a secondary synchronization signal (SSS). A terminal device needs to receive a PSS and an SSS. The PSS is (at least) used by a synchronization signal receiver to: determine a boundary of an initial symbol, a synchronization signal block (SSB) location, a cyclic prefix, and a boundary of a subframe, perform initial frequency synchronization for a cell, and so on. SSS is used for radio frame boundary calibration. The PSS and the SSS are used together for physical layer cell identity (physical layer cell ID) detection. To transmit a synchronization signal, the network device first needs to generate a corresponding sequence. A design of a synchronization signal on an NR cellular link (Uu) is specified in NR release 15. The cellular link is usually referred to as a Uu link in the standard, and is a radio link between a terminal device and a network device, for example, a radio link between a mobile phone or a vehicle-mounted communications device and a base station. For convenience, all synchronization signals on a Uu link in the NR system described below are downlink synchronization signals.

A primary synchronization sequence $d_{PSS}(n)$ for the PSS is generated according to the following formula:

$$d_{PSS}(n) = 1 - 2x(m) \quad (1)$$
$$m = (n + 43N_{ID}^{(2)}) \bmod 127,$$
$$0 \le n < 127$$

where $$x(i+7) = (x(i+4) + x(i)) \bmod 2, \quad (2)$$

and $$[x(6)\,x(5)\,x(4)\,x(3)\,x(2)\,x(1)\,x(0)] = [1110110]; \quad (3)$$

wherein $x(0)$ to $x(6)$ are initial values, the formula (2) is a generator polynomial of a binary sequence $\bar{x}$, and the binary sequence $\bar{x}$ may be generated based on the initial values (3) and the generator polynomial (2). The binary sequence x̄ generated in the foregoing manner is an m-sequence. The m-sequence is short for a longest linear feedback displacement register sequence, and is a pseudo random sequence, a pseudo noise (pseudo noise, PN) code, or a pseudo random code. In the formula (1), m=(n+43$N_{ID}^{(2)}$) mod 127 is an expression of an independent variable of each code element of the binary sequence x̄. The independent variable m may be considered as a cyclic shift of an independent variable n in $d_{PSS}(n)$, and a corresponding cyclic shift value is 43 $N_{ID}^{(2)}$, where $N_{ID}^{(1)}$ and $N_{ID}^{(2)}$ are identities related to a cell identity (cell ID) $N_{ID}^{cell}$. The NR standard defines 1008 physical layer cell identities that satisfy $N_{ID}^{cell}=3N_{ID}^{(1)}+N_{ID}^{(2)}$, where $N_{ID}^{(2)} \in \{0,1,2\}$, and $N_{ID}^{(1)} \in \{0,1,\ldots,335\}$. The network device may obtain the identities $N_{ID}^{(1)}$ and $N_{ID}^{(2)}$ based on the cell identity $N_{ID}^{cell}$, and generate the primary synchronization sequence $d_{PSS}(n)$ with reference to the formulas (1), (2), and (3). All primary synchronization sequences that can be generated by using the foregoing formulas form a primary synchronization sequence set on the Uu link in the NR system. For ease of description, the primary synchronization sequence set is represented as $\{d_{PSS}(n)\}$.

A secondary synchronization sequence $d_{SSS}(n)$ for the SSS is generated according to the following formula:

$$d_{SSS}(n) = [1 - 2x_0((n + m_0)\mod 127)][1 - 2x_1((n + m_1)\mod 127)] \quad (4)$$
$$m_0 = 15\left\lfloor \frac{N_{ID}^{(1)}}{112} \right\rfloor + 5N_{ID}^{(2)}$$
$$m_1 = N_{ID}^{(1)} \mod 112$$
$$0 \le n < 127$$

where $$x_0(i+7)=(x_0(i+4)+x_0(i))\mod 2$$
$$x_1(i+7)=(x_1(i+1)+x_1(i))\mod 2 \quad (5)$$

and $$[x_0(6)x_0(5)x_0(4)x_0(3)x_0(2)x_0(1)x_0(0)]=[0000001]$$
$$[x_1(6)x_1(5)x_1(4)x_1(3)x_1(2)x_1(1)x_1(0)]=[0000001]; \quad (6)$$

Wherein a Gold code sequence is used for designing the secondary synchronization sequence $d_{SSS}(n)$. The Gold code sequence is a sequence generated based on m-sequences, and includes two m-sequences. For example, as described in the formulas (4), (5), and (6), x̄₀ and x̄₁ are two binary m-sequences. Similarly, $x_0(0)$ to $x_0(6)$ are initial values of the sequence x̄₀, and $x_1(0)$ to $x_1(6)$ are initial values of the sequence x̄₁. For ease of description, this application defines $d_4^1(n)=[1-2x_0((n+m_0)\mod 127)]$ and $d_4^2(n)=[1-2x_1((n+m_1)\mod 127)]$. Therefore, $d_4(n)=d_4^1(n)\cdot d_4^2(n)$. The formula (5) is generator polynomials of the binary m-sequences x̄₀ and x̄₁. $M_0$ is a cyclic shift value of the sequence x̄₀, and $m_1$ is a cyclic shift value of the sequence x̄₁. $N_{ID}^{(2)}$ and $N_{ID}^{(2)}$ are identities related to a cell identity (cell ID) $N_{ID}^{cell}$. The NR standard defines 1008 physical layer cell identities that satisfy $N_{ID}^{cell}=3N_{ID}^{(1)}+N_{ID}^{(2)}$, where $N_{ID}^{(2)} \in \{0,1,2\}$, and $N_{ID}^{(1)} \in \{0,1,\ldots,335\}$. All secondary synchronization sequences that can be generated by using the foregoing formulas form a secondary synchronization sequence set on the Uu link in the NR system. For ease of description, the secondary synchronization sequence set is represented as $\{d_{SSS}(n)\}$ in this application.

It can be learned from the foregoing design of the synchronization signal on the Uu link in the 5G NR system that the synchronization cell identity $N_{ID}^{cell}$ can uniquely identify a group of a primary synchronization sequence and a secondary synchronization sequence, and a synchronization sequence set in the system includes 1008 different groups of a primary synchronization sequence and a secondary synchronization sequence in total. In actual network deployment, when a wireless communications system, for example, the NR system, in an area further includes a source synchronization device of another service other than a cellular network service or when there is still a source synchronization device of another wireless communications system other than the NR system in space, if a synchronization sequence included in a synchronization signal transmitted by the another source synchronization device is the same as or is highly correlated with a synchronization sequence on the Uu link in the NR system, a device that receives the synchronization signal cannot distinguish between the synchronization signal on the Uu link in the NR system and the synchronization signal of the another source synchronization device. In other words, a synchronization signal of a different service or in a different communications system and the synchronization signal on the Uu link in the NR system may interfere with each other. It should be understood that the another source synchronization device is a source synchronization device that supports a service other than the cellular network in the NR system, or a source synchronization device in a wireless communications system other than the NR system.

To resolve the foregoing problem, the embodiments of this application provide a synchronization sequence design solution, a synchronization sequence obtained by using the method provided in the embodiments of this application can be different from and has relatively low correlation with any synchronization sequence of the synchronization sequence set in the 5G NR system, to effectively reduce interference between the synchronization signal of the another source synchronization device and the synchronization signal on the Uu link in the NR system, thereby improving synchronization performance between devices.

In the embodiments of this application, a vehicle-to-everything (V2X) service in the NR system is described as an example of a different service. A terminal device that supports the V2X service in the NR system may directly communicate with another terminal device, without relaying of a network device. The terminal device serving as a source synchronization device transmits a first synchronization signal and/or a second synchronization signal, where the first synchronization signal may be a primary synchronization signal, and the second synchronization signal may be a secondary synchronization signal.

In a possible design, a first synchronization sequence is different from any sequence of $\{d_{PSS}(n)\}$, and/or a second synchronization sequence is different from any sequence of $\{d_{SSS}(n)\}$.

In a possible implementation, the first synchronization sequence is a cyclic shift of any sequence of $\{d_{PSS}(n)\}$, and/or a generator polynomial corresponding to the first synchronization sequence is different from a generator polynomial corresponding to any sequence of $\{d_{PSS}(n)\}$. It can be learned from the foregoing descriptions that the binary sequence x̄ is an m-sequence. It can be learned from a feature of the m-sequence that a cross-correlation value of an m-sequence and a cyclic shift of the m-sequence is a theoretical optimal value of −1. The following formula can be used for description:

$$R(m, n) = \sum_{i=0}^{L-1} d((i + m) \bmod L)) \cdot d((i + n) \bmod L)) = -1, \quad (10)$$

if $m \neq n$.

Wherein (a mod b) indicates that a modulo operation is performed on a value b by using a value a, and $\bar{d}(i)$ is a BPSK sequence obtained by mapping a binary m-sequence. d((i+m)mod L)) is physically a cyclic shift of the sequence d(i) based on a cyclic shift value of m, where L is a length of the sequence, and d(i) indicates a value of an $i^{th}$ code element of the sequence. Therefore, that the first synchronization sequence $d_1(n)$ is a cyclic shift of any sequence of $\{d_{PSS}(n)\}$ indicates that a correlation value of the first synchronization sequence and any sequence of $\{d_{PSS}(n)\}$ is a theoretical minimum value, so that interference between the first synchronization signal corresponding to the first synchronization sequence and the primary synchronization signal on the Uu link in the NR system can be reduced. Therefore, that the first synchronization sequence is a cyclic shift of any sequence of $\{d_{PSS}(n)\}$ ensures that the interference between the first synchronization signal corresponding to the first synchronization sequence and the primary synchronization signal on the Uu link in the NR system is relatively low, to be specific, a normalized cross-correlation value of the first synchronization signal corresponding to the first synchronization sequence and the primary synchronization signal on the Uu link in the NR system reaches 1/L, which is the theoretical minimum. For example, when L=127, a corresponding value is approximately 0.0079. In an actual communications system, this is a very low mutual interference value. The first synchronization sequence is the cyclic shift of any sequence of $\{d_{PSS}(n)\}$. In a possible implementation, the first synchronization sequence is generated by using a same generator polynomial as that used to generate an m-sequence for the primary synchronization signal sequence on the Uu link in the NR system, but using a different cyclic shift value. Generating an m-sequence refers to using a generator polynomial. By using a different cyclic shift value, a different sequence could be generated and therefore to reach the theoretically optimal correlation performance of the m-sequence in the formula (10). A length of the primary synchronization signal sequence on the Uu link in the NR system is 127, and currently, only three cyclic shift values 0, 43, and 86 are used. For an m-sequence with a length of 127, a total of 127 different cyclic shift values may be used. Therefore, sufficient cyclic shift values may be used for generating the first synchronization sequence in the embodiments of this application.

In addition, optionally, when the m-sequence is generated by using a generator polynomial different from the generator polynomial corresponding to any sequence of $\{d_{PSS}(n)\}$, cross-correlation between the first synchronization sequence and any sequence of $\{d_{PSS}(n)\}$ can be reduced. In addition, this design method is simple, requires a slight change in the design of the Uu link in the NR system, and has strong version inheritance. For an m-sequence of a certain length, at least one different m-sequence paired with the m-sequence can always be found, and a cross-correlation value of the m-sequences can reach a theoretical boundary of the sequences (for details, refer to a formula (11) below). There is always a generator polynomial corresponding to any one of m-sequences whose cyclic shifts are not equivalent. Therefore, if the generator polynomial corresponding to the first synchronization sequence is different from the generator polynomial corresponding to the primary synchronization signal sequence on the Uu link in the NR system, regardless of their respective cyclic shift values, the first synchronization sequence and the primary synchronization sequence are always different from each other and have optimal cross-correlation that can be theoretically achieved as described above. Therefore, when different generator polynomials are applied, a cyclic shift value corresponding to the first synchronization sequence is not specifically limited. Optionally, when different generator polynomials are applied, a cyclic shift value the same as that corresponding to the primary synchronization signal sequence on the Uu link in the NR system may be used.

In one case, that the first synchronization sequence is a cyclic shift of any sequence of $\{d_{PSS}(n)\}$ may be implemented in the following manner: The first synchronization sequence satisfies $d_1(n)=1-2x(m')$, where $m'=(n+\Delta+43N_{ID}^{(2)'})\bmod 127$, $0 \leq n < 127$, $N_{ID}^{(2)'} \in \{0,1,2\}$, and $\Delta$ is a non-zero integer. It can be learned from the foregoing descriptions that after the binary m-sequence $\bar{x}$ is generated, the primary synchronization sequence $d_{PSS}(n)$ is a cyclic shift of the m-sequence $\bar{x}$ by using $43N_{ID}^{(2)}$ as a cyclic shift value. In this case, for the first synchronization sequence $d_1^{(n)}$, an offset value $\Delta$ is added to the cyclic shift value based on the m-sequence $\bar{x}$ the same as that of $d_{PSS}(n)$. That is, the first synchronization sequence $d_1(n)$ is a cyclic shift of the m-sequence $\bar{x}$ by using $\Delta+43N_{ID}^{(2)'}$ as a cyclic shift value, where $N_{ID}^{(2)'} \in N_{ID}^{(2)}$. Optionally, $N_{ID}^{(1)'} \in \{0,1,\ldots,335\}$ and $N_{ID}^{(2)'} \in \{0,1,2\}$ are respectively the same as value ranges of $N_{ID}^{(1)}$ and $N_{ID}^{(2)}$ in the expression $d_{PSS}(n)$. Optionally, $N_{ID}^{(1)'} \in N_{ID}^{(1)}$, and $N_{ID}^{(2)'} \in N_{ID}^{(2)}$. Therefore, in this case, it can be ensured that the first synchronization sequence $d_1(n)$ is a cyclic shift of any sequence of $\{d_{PSS}(n)\}$. Further, new cyclic shift values $(\Delta+43N_{ID}^{(2)'})$ are placed at an equal interval relative to the three cyclic shift values corresponding to $d_{PSS}(n)$. In this case, the first synchronization sequence $d_1(n)$ has a better frequency deviation detection performance towards the primary synchronization sequence $d_{PSS}(n)$ on the Uu link in the NR system. The reason is that, for the m-sequence, if intervals among cyclic shift values of a target sequence, detected by a device, and cyclic shift values of another potential target or potential interference sequence are not equal, anti-frequency-deviation performance is determined by a smaller interval. An anti-frequency-deviation capability can reach a maximum value only when the intervals among the cyclic shift values of the target sequence and the cyclic shift values of the another potential target or interference sequence are equal or are as even as possible. It should be noted that, in this case, the first synchronization sequence $d_1(n)$ is based on the m-sequence $\bar{x}$ the same as that of $d_{PSS}(n)$, and the m-sequence $\bar{x}$ may be generated by using a same generator polynomial and a same initial value, or may be generated by using different generator polynomials and initial values. This is not limited herein.

Optionally, $\Delta = \lfloor 43/R \rfloor$ or $\Delta = \lceil 43/R \rceil$, where R is a positive integer, $\lfloor \ \rfloor$ represents rounding down, and $\lceil \ \rceil$ represents rounding up. For example, R=4, R=3, or R=2.

Figure 4:
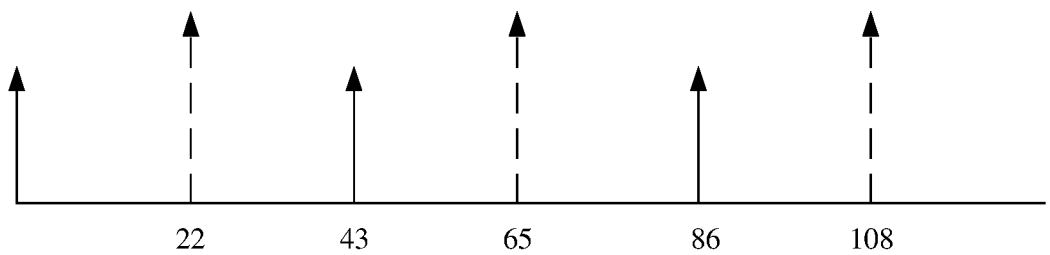
FIG. 4 is a schematic diagram of intervals between different cyclic shift values based on an m-sequence according to an embodiment of this application.

Optionally, $\Delta=21$, or $\Delta=22$. When R=2, $\Delta=\lfloor 43/R' \rfloor=21$, or $\Delta=\lceil 43/R \rceil=22$ In this case, the intervals among the cyclic shift values corresponding to the first synchronization sequence $d_1(n)$ and the cyclic shift values corresponding to $d_{PSS}(n)$ are equal. As shown in FIG. 4, solid-line arrows represent the cyclic shift values corresponding to $d_{PSS}(n)$, which are 0, 43, and 86, and an interval between the cyclic shift values is 43. Dashed arrows represent the cyclic shift values corresponding to the first synchronization sequence $d_1(n)$. When $\Delta=22$, the cyclic shift value is exactly close to half of the interval 43, and cyclic shift values corresponding to $d_1(n)$ are 22, 65, and 108. In this case, the intervals between a cyclic shift value corresponding to $d_1(n)$ and an adjacent cyclic shift value corresponding to $d_{PSS}(n)$ are equal. Therefore, the first synchronization sequence $d_1(n)$ has optimal frequency deviation detection performance towards the primary synchronization sequence $d_{PSS}(n)$ on the Uu link in the NR system.

Optionally, the offset value $\Delta$ is notified by signaling, or the offset value $\Delta$ is predefined. Further, the offset value $\Delta$ may be directly notified by the base station via RRC signaling, a SIB, or DCI signaling, or may be indirectly indicated by another parameter. Alternatively, optionally, the offset value $\Delta$ may be directly notified by the terminal device via control signaling on a sidelink (sidelink) between devices, or may be indirectly indicated by another parameter. In an indirect indication manner, for example, an identity of a synchronization sequence or an identity of a group number to which a synchronization sequence belongs may be used for indication.

For example, the first synchronization sequence may be generated according to the following formula:

$$d_1(n) = 1 - 2x(m') \quad (7)$$
$$m' = \left(n + \Delta + 43N_{ID}^{(2)'}\right) \bmod 127,$$
$$0 \leq n < 127$$
$$0 < \Delta < 43$$

where $$x(i+7) = (x(i+4) + x(i)) \bmod 2, \quad (8)$$

and $$[x(6)x(5)x(4)x(3)x(2)x(1)x(0)] = [1110110]; \quad (9)$$

Wherein $x(0)$ to $x(6)$ are initial values, and the formula (8) is the generator polynomial of the binary sequence $\bar{x}$. Both the initial values and the generator polynomial are the same as the corresponding initial values and generator polynomial of the primary synchronization sequence, namely, $d_{PSS}(n)$, on the Uu link in the NR system. Compared with m in the formula (1), an offset value $\Delta$ is added to m' in the formula (7), where $\kappa < \Delta < 43$ and $\Delta$ is a positive integer. In this way, in this possible design, the first synchronization sequence $d_1(n)$ is a cyclic shift of any sequence of $\{d_{PSS}(n)\}$. Optionally, $N_{ID}^{(1)'} \in \{0, 1, \ldots, 335\}$ and $N_{ID}^{(2)'} \in \{0, 1, 2\}$ are respectively the same as the value ranges of ID and ID in the expression $d_{PSS}(n)$. Optionally, $N_{ID}^{(1)'} \in N_{ID}^{(1)}$, and $N_{ID}^{(2)'} \in N_{ID}^{(2)}$.

In a possible implementation, the generator polynomial corresponding to the first synchronization sequence is different from the generator polynomial corresponding to any sequence of $\{d_{PSS}(n)\}$, and the first synchronization sequence is generated by using an m-sequence that has a same length as but has a different generator polynomial from the m-sequence corresponding to $d_{PSS}(n)$. This can reduce cross-correlation between the first synchronization sequence and any sequence of $\{d_{PSS}(n)\}$. In addition, this design method is simple, requires a slight change in the design of the Uu link in the NR system, and has strong version inheritance.

In this implementation, the generator polynomial of the first synchronization sequence may be $$x(i+7) = \left(\sum_{n=0}^{6} K_n x(i+n)\right) \bmod 2,$$

where $[K_6, K_5, K_4, K_3, K_2, K_1, K_0] \neq [0,0,1,0,0,0,1]$, $K_n$ is an integer, and $x(0)$ to $x(6)$ are initial values. Generally, initial values of a sequence cannot be all zero. When the initial values of the sequence are all zero, a corresponding sequence cannot be generated by using a generator polynomial. The reason is that the initial values of the sequence correspond to initial states of cyclic shift registers in the m-sequence. If the initial values are all zero, a result output by the cyclic shift register is always 0. Non-zero values of the initial values are not particularly limited in the present invention.

Optionally, the generator polynomial corresponding to the first synchronization sequence is $x(i+7) = (x(i+1) + x(i)) \bmod 2$. The generator polynomial $x(i+7) = (x(i+1) + x(i)) \bmod 2$ and a generator polynomial $x(i+7) = (x(i+4) + x(i)) \bmod 2$ corresponding to any sequence of $\{d_{PSS}(n)\}$ are a pair of unrelated generator polynomials. In m-sequences with a same shift register length, only m-sequences generated by using a pair of unrelated generator polynomials have the optimal cross-correlation. Cross-correlation is a correlation value of two sequences whose cyclic shifts are not equivalent. The optimal cross-correlation means that a cross-correlation value of the two sequences having any cyclic shift values has the following theoretical minimum value:

$$R(m, n) = \sum_{i=0}^{L-1} d_1((i+m) \bmod L) \cdot d_2((i+n) \bmod L) \leq 1 + 2^{\lfloor (K+2)/2 \rfloor}, \quad (11)$$

Wherein $L = 2K - 1$. For example, in the foregoing embodiment, $K = 7$, and $L = 127$. Regardless of the cyclic shift value corresponding to the first synchronization sequence in this implementation, the first synchronization sequence may be different from any sequence of $\{d_{PSS}(n)\}$, so that the cyclic shift value corresponding to the first synchronization sequence is determined. In addition, further, related performance of the sequence, obtained after the sequence is changed from a frequency domain to a time domain or from a time domain to a frequency domain, is similar. Therefore, there are few restrictions on an implementation algorithm of the receiver, and the implementation is easier.

In other services other than a cellular link service in the same wireless communications system, for example, a sidelink to be studied in the NR system, different modes may exist. These modes on the sidelink can be defined in different ways. For example, the modes may be determined based on features defined in different protocol versions, or the modes may be determined based on service types, or the modes may be determined based on resource selection and allocation manners. For example, a first mode is used to support an eMBB service, and a second mode is used to support a V2X service. For another example, classification may alternatively be performed based on technical features in a protocol standardization process. For example, a mode 1 and/or a mode 2 are/is defined in a version A, and a mode 3 and/or a mode 4 are/is defined in a version B. Alternatively, the modes may be defined based on resource scheduling manners. For example, a mode 1 is a manner in which resource scheduling is based on configuration or indication of a base station, and a mode 2 is a manner of selecting a resource by a terminal itself.

In the embodiments of this application, optionally, when a same terminal device or a same network device supports a plurality of different modes, different methods may be used to generate synchronization sequences. In other words, the terminal device or the network device may further generate a fifth synchronization sequence, where the fifth synchronization sequence and the first synchronization sequence are respectively corresponding to the first mode and the second mode. All possible first synchronization sequences form a first synchronization sequence set. The fifth synchronization sequence is different from any sequence of the first synchronization sequence set. The difference includes: The fifth synchronization sequence is a cyclic shift of any sequence of the first synchronization sequence set; and/or a generator polynomial corresponding to the fifth synchronization sequence is different from a generator polynomial corresponding to any sequence of the first synchronization sequence set. When sidelink transmissions in a plurality of modes coexist, mutual interference between sidelink synchronization signal transmissions in different modes can also be reduced or controlled. For example, the fifth synchronization sequence may be generated in any one of the following manners.

Manner 1: The first mode and the second mode correspond to a same generator polynomial, a sequence in the first synchronization sequence set corresponds to a first cyclic shift value, the fifth synchronization sequence corresponds to a second cyclic shift value, and the first cyclic shift value is different from the second cyclic shift value.

Manner 2: The first mode and the second mode correspond to different generator polynomials. That is, the generator polynomial corresponding to the fifth synchronization sequence is different from the generator polynomial corresponding to any sequence of the first synchronization sequence set.

Manner 3: A sequence in the first synchronization sequence set corresponds to a first generator polynomial and a first cyclic shift value, the fifth synchronization sequence corresponds to a second generator polynomial and a second cyclic shift value, the first generator polynomial is different from the second generator polynomial, and the first cyclic shift value is different from the second cyclic shift value.

In a possible implementation, the second synchronization sequence $d_2(n)$ may satisfy:

$d_2(n)=d_2^1(n)\cdot d_2^2(n)=[1-2x_0((n+m_0')\bmod 127)][1-2x_1((n+m_1')\bmod 127)]$, $0 \le n < 127$;

For ease of description, the sequence $d_2^1(n)=[1-2x_0((n+m_0')\bmod 127)]$ and the $d_2^2(n)=[1-2x_1((n+m_1')\bmod 127)]$ are defined in this application. That a second synchronization sequence is different from any sequence of $\{d_{SSS}(n)\}$ includes: The sequence $d_2^1(n)$ is a cyclic shift of a sequence $d_4^1(n)$, and/or the sequence $d_2^2(n)$ is a cyclic shift of a sequence $d_4^2(n)$; and/or a generator polynomial corresponding to the second synchronization sequence is different from a generator polynomial corresponding to any sequence of $\{d_{SSS}(n)\}$. The second synchronization sequence is also generated based on a Gold code sequence. It can be learned from the foregoing feature of the Gold code sequence that the sequence $d_2^1(n)$ and the sequence $d_2^2(n)$ that form the second synchronization sequence are each generated based on one m-sequence. Therefore, based on a reason the same as or similar to that for the first synchronization sequence, when the sequence $d_2^1(n)$ is the cyclic shift of the sequence $d_4^1(n)$ and/or the sequence $d_2^2(n)$ is the cyclic shift of the sequence $d_4^2(n)$, the second synchronization sequence and any sequence of $\{d_{SSS}(n)\}$ may have theoretically lowest correlation. Likewise, when the generator polynomial corresponding to the second synchronization sequence is different from any generator polynomial corresponding to a sequence of $\{d_{SSS}(n)\}$, the second synchronization sequence may be based on a different Gold sequence from that of a secondary synchronization signal on the Uu link in the NR system, so that the second synchronization sequence has relatively low correlation with any sequence of $\{d_{SSS}(n)\}$. Analysis of the correlation is similar to the foregoing descriptions, and details are not described herein again.

In one case, that the sequence $d_2^1(n)$ is a cyclic shift of a sequence $d_4^1(n)$, and/or the sequence $d_2^2(n)$ is a cyclic shift of a sequence $d_4^2(n)$ may be implemented in the following manner. The second synchronization sequence satisfies $$m_0' = 15\left\lfloor \frac{N_{ID}^{(1)''}}{112} \right\rfloor + \Theta + 5N_{ID}^{(2)'}$$

and $m_1'=N_{ID}^{(1)''} \bmod 112$, where $\Theta$ is a non-zero integer. Optionally, $N_{ID}^{(1)''} \in \{0,1,\ldots,335\}$ and $N_{ID}^{(2)'} \in \{0, 1, 2\}$ are respectively the same as the value ranges of $N_{ID}^{(1)}$ and $N_{ID}^{(2)}$ in the expression $d_{SSS}(n)$. Optionally, $N_{ID}^{(1)''} \in N_{ID}^{(1)}$, and $N_{ID}^{(2)'} \in N_{ID}^{(2)}$. It can be learned from the foregoing descriptions that, after the binary m-sequence $\bar{x}_0$ is generated, the sequence $d_4^1(n)$ in the secondary synchronization sequence $d_{SSS}(n)$ is a cyclic shift of the m-sequence $\bar{x}_0$ by using $m_0$ as a cyclic shift value. In this case, for the sequence $d_2^1(n)$ in the second synchronization sequence $d_2(n)$, an offset value $\Theta$ is added to the cyclic shift value based on the m-sequence $\bar{x}_0$ the same as that of $d_4^1(n)$. In other words, the sequence $d_2^1(n)$ is a cyclic shift of the m-sequence $\bar{x}_0$ by using $m_0'=\Theta+m_0$ as a cyclic shift value. Therefore, in this case, it can be ensured that the sequence $d_1^1(n)$ is a cyclic shift of the sequence $d_4^1(n)$. Further, new cyclic shift values $m_0'=\Theta+m_0$ are placed at an equal interval relative to cyclic shift values corresponding to the sequence $d_4^1(n)$. In this case, the second synchronization sequence may have a better frequency deviation detection performance towards the secondary synchronization sequence $d_{SSS}(n)$ on the Uu link in the NR system. The reason is that, for the m-sequence, if intervals among cyclic shift values of target sequences, detected by a device, and cyclic shift values of another potential targets or interference sequences are not equal, anti-frequency deviation detection performance is determined by a smaller interval. An anti-frequency-deviation capability can reach a maximum value only when the intervals among the cyclic shift values of the target sequences and the cyclic shift values of the another potential target or interference sequences are equal or are as even as possible. It should be noted that, in this case, the sequence $d_2^1(n)$ is based on the m-sequence $\bar{x}_0$ the same as that of $d_4^1(n)$, and the m-sequence $\bar{x}_0$ may be generated by using a same generator polynomial and a same initial value, or may be generated by using different generator polynomials and initial values. This is not limited herein.

Optionally, $\Theta \ge 45$, indicating that the added offset value of the cyclic shift value is further selected after 45; $\Theta$ is greater than zero and is not an integer multiple of 5, indicating that the added offset value is not specifically limited, but cannot be the same as an existing value; or $\Theta$ is greater than or equal to 45 and is an integer multiple of 5, indicating that the added offset value is further selected after 45 and is selected at an equal interval of 5. According to the foregoing selection methods, a newly generated sequence may be different from a secondary synchronization sequence on an existing Uu link, and is a cyclic shift of the secondary synchronization sequence. When selection is further performed at an equal interval of a multiple of 5, performance of anti-frequency-deviation between sequences can be further improved. Further, Θ=45. The offset value Θ is indicated by signaling, or the offset value Θ is predefined. In this case, an interval between the cyclic shift values corresponding to the sequence $d_2^1(n)$ and an interval between the cyclic shift values corresponding to $d_4^1(n)$ are equal, and intervals between a cyclic shift value corresponding to $d_2^1(n)$ and an adjacent cyclic shift value corresponding to $d_4^1(n)$ are equal. Therefore, frequency deviation detection performance of the second synchronization sequence $d_2(n)$ towards the primary synchronization sequence $d_{SSS}(n)$ on the Uu link in the NR system can be improved.

Optionally, the second synchronization sequence may also satisfy $$m'_0 = 15\left\lfloor\frac{N_{ID}^{(1)}}{112}\right\rfloor + 5\left(N_{ID}^{(2)'} + \Theta\right)$$

In this case, the offset value Θ changes correspondingly. It should be understood that any simple variation of $m_b'$ falls within the scope disclosed in the embodiments of this application. A specific value change is not listed in detail in the embodiments of this application.

Optionally, the offset value Θ is notified by signaling, or the offset value Θ is predefined.

Optionally, generator polynomials corresponding to the second synchronization sequence are $x_0(i+7)=(x_0(i+4)+x_0(i))\mod 2$ and $x_1(i+7)=(x_1(i+1)+x_1(i))\mod 2$, where $x_0(0)$ to $x_0(6)$ are initial values, and $x_1(0)$ to $x_1(6)$ are initial values. Further, optionally, $[x_0(6)\ x_0(5)\ x_0(4)\ x_0(3)\ x_0(2)\ x_0(1)\ x_0(0)]=[0\ 0\ 0\ 0\ 0\ 0\ 1]$, and $[x_1(6)\ x_1(5)\ x_1(4)\ x_1(3)\ x_1(2)\ x_1(1)\ x_1(0)]=[0\ 0\ 0\ 0\ 0\ 0\ 1]$. In this case, the second synchronization sequence may be generated according to the following formula:

$$d_2(n) = d_2^1(n) \cdot d_2^2(n) = \qquad(12)$$
$$[1 - 2x_0((n + m'_0)\mod 127)][1 - 2x_1((n + m'_1)\mod 127)]$$
$$m'_0 = 15\left\lfloor\frac{N_{ID}^{(1)}}{112}\right\rfloor + \Theta + 5N_{ID}^{(2)'}$$
$$m'_1 = N_{ID}^{(1)'}\mod 112$$
$$0 \le n < 127$$

where $$x_0(i+7)=(x_0(i+4)+x_0(i))\mod 2$$

$$x_1(i+7)=(x_1(i+1)+x_1(i))\mod 2, \qquad(13)$$

and $$[x_0(6)x_0(5)x_0(4)x_0(3)x_0(2)x_0(1)x_0(0)]=[0000001]$$

$$[x_1(6)x_1(5)x_1(4)x_1(3)x_1(2)x_1(1)x_1(0)]=[0000001],\qquad(14)$$

and $N_{ID}^{(1)'} \in N_{ID}^{(1)}$, and $N_{ID}^{(2)'} \in N_{ID}^{(2)}$. The following uses this possible case as an example to further analyze a feature of the second synchronization sequence designed in the embodiments of this application. For the primary synchronization signal on the Uu link in the NR system, values of parameters in an expression corresponding to the primary synchronization signal are shown in Table 1.

TABLE 1

Values of parameters in an expression corresponding to $d_{PSS}(n)$

| $N_{ID}^{(2)} \in \{0,1,2\}$ | $N_{ID}^{(2)} = 0$ | $N_{ID}^{(2)} = 1$ | $N_{ID}^{(2)} = 2$ |
|---|---|---|---|
| $m_0 = 15\left\lfloor\frac{N_{ID}^{(1)}}{112}\right\rfloor + 5N_{ID}^{(2)}$ | 0, 15, 30 | 5, 20, 35 | 10, 25, 40 |
| $N_{ID}^{(1)}, N_{ID}^{(1)} \in \{0, 1, \ldots, 335\}$ | 0, 1, ..., 111 | 112, 113, ..., 223 | 224, 225, ..., 335 |
| $m_1 = N_{ID}^{(1)} \mod 112$ | 0, 1, ..., 111 | 0, 1, ..., 111 | 0, 1, ..., 111 |

For the second synchronization sequence designed according to the foregoing formulas (12), (13), and (14), for example, when Θ=45, values of parameters in the formulas are shown in Table 2.

TABLE 2

Values of parameters in formulas (12), (13), and (14) in a case of Θ = 45

| $N_{ID}^{(2)} \in \{0,1,2\}$ | $N_{ID}^{(2)} = 0$ | $N_{ID}^{(2)} = 1$ | $N_{ID}^{(2)} = 2$ |
|---|---|---|---|
| $m'_0 = 15\left\lfloor\frac{N_{ID}^{(1)}}{112}\right\rfloor + 5N_{ID}^{(2)} + 45$ | 45, 60, 75 | 50, 65, 80 | 55, 70, 85 |
| $N_{ID}^{(1)}, N_{ID}^{(1)} \in \{0, 1, \ldots, 335\}$ | 0, 1, ..., 111 | 112, 113, ..., 223 | 224, 225, ..., 335 |
| $m_1' = N_{ID}^{(1)} \mod 112$ | 0, 1, ..., 111 | 0, 1, ..., 111 | 0, 1, ..., 111 |

It can be learned from the comparison between Table 1 and Table 2 that $m_0'$ and $m_0$ are different and are both less than 126. Therefore, it can be ensured that the second synchronization sequence generated by using the foregoing method has theoretically lowest correlation with any sequence of $\{d_{SSS}(n)\}$. In this way, a mutual interference value of the two sequences is minimized.

In a possible implementation, the generator polynomial corresponding to the second synchronization sequence is different from the generator polynomial corresponding to any sequence of $\{d_{SSS}(n)\}$. The second synchronization sequence is generated by using an m-sequence that has a same length as but has a different generator polynomial from the m-sequence corresponding to $\{d_{SSS}(n)\}$. This can reduce cross-correlation between the second synchronization sequence and any sequence of $\{d_{SSS}(n)\}$. In addition, this design method is simple, requires a slight change in the design of the Uu link in the NR system, and has strong version inheritance. A Gold sequence of a specific length is generated by using two m-sequences of an equal length. As long as a generator polynomial of either of the m-sequences changes, the generated Gold sequence is different. Therefore, if the generator polynomial corresponding to the second synchronization sequence is different from the generator polynomial corresponding to the secondary synchronization signal sequence on the Uu link in the NR system, sequences generated based on the respective generator polynomials, regardless of their respective cyclic shift values, are always different and have lower cross-correlation. Therefore, when different generator polynomials are used, the cyclic shift value corresponding to the second synchronization sequence is not specifically limited. Optionally, when different generator polynomials are used, a cyclic shift value that is the same as that of the secondary synchronization signal sequence on the Uu link in the NR system may be used.

Optionally, in this implementation, the generator polynomial corresponding to the second synchronization sequence may include $x_0(i+7)=(x_0(i+3)+x_0(i))\mod 2$, where $x_0(0)$ to $x_0(6)$ are initial values.

Optionally, the generator polynomial corresponding to the second synchronization sequence may include $x_1(i+7)=(x_1(i+3)+x_1(i+2)+x_1(i+1)+x_1(i))\mod 2$, where $x_1(0)$ to $x_1(6)$ are initial values.

In other services other than a cellular link service in the same wireless communications system, for example, a sidelink to be studied in the NR system, different modes may exist. These modes on the sidelink can be defined in different ways. For example, the modes may be determined based on features defined in different protocol versions, or the modes may be determined based on service types, or the modes may be determined based on resource selection and allocation manners. For example, a first mode is used to support an eMBB service, and a second mode is used to support a V2X service. For another example, classification may alternatively be performed based on technical features in a protocol standardization process. For example, a mode 1 and/or a mode 2 are/is defined in a version A, and a mode 3 and/or a mode 4 are/is defined in a version B. Alternatively, the modes may be defined based on resource scheduling manners. For example, a mode 1 is a manner in which resource scheduling is based on configuration or indication of a base station, and a mode 2 is a manner of selecting a resource by a terminal.

In the possible implementation, optionally, when a same terminal device or a same network device supports a plurality of different modes, different methods may be used to generate synchronization sequences. In other words, the terminal device or the network device may further generate a sixth synchronization sequence, where the sixth synchronization sequence and the second synchronization sequence are respectively corresponding to the first mode and the second mode. All possible second synchronization sequences form a second synchronization sequence set. The sixth synchronization sequence is different from any sequence of the second synchronization sequence set. The difference includes: One or more m-sequences corresponding to the sixth synchronization sequence is/are a cyclic shift/cyclic shifts of one or more m-sequences corresponding to any sequence of the second synchronization sequence set; and/or a generator polynomial corresponding to the sixth synchronization sequence is different from a generator polynomial corresponding to any sequence of the second synchronization sequence set. When sidelink transmissions in a plurality of modes coexist, mutual interference between sidelink synchronization signal transmissions in different modes can also be reduced or controlled. For example, the sixth synchronization sequence may be generated in any one of the following manners.

Manner 1: The first mode and the second mode correspond to a same generator polynomial, the one or more m-sequences of a sequence in the second synchronization sequence set corresponds/correspond to a first cyclic shift value, and the one or more m-sequences of the sixth synchronization sequence corresponds/correspond to a second cyclic shift value, and the first cyclic shift value is different from the second cyclic shift value.

Manner 2: The first mode and the second mode correspond to different generator polynomials. That is, the generator polynomial corresponding to the one or more m-sequences of the sixth synchronization sequence is different from the generator polynomial corresponding to the one or more m-sequences of any sequence in the second synchronization sequence set.

Manner 3: The one or more m-sequences of any sequence in the second synchronization sequence set corresponds/correspond to a first generator polynomial and a first cyclic shift value, the one or more m-sequences of the sixth synchronization sequence corresponds/correspond to a second generator polynomial and a second cyclic shift value, the first generator polynomial is different from the second generator polynomial, and the first cyclic shift value is different from the second cyclic shift value.

In the foregoing possible implementation, $N_{ID}^{(1)\prime} \in N_{ID}^{(1)}$, $N_{ID}^{(2)\prime} \in N_{ID}^{(2)}$, and $N_{ID}^{(1)\prime}$ and $N_{ID}^{(2)\prime}$ are determined by using a synchronization signal identity $N_{ID}$, and all different synchronization signal identities $N_{ID}$ in the system form a synchronization signal identity set. The synchronization signal identity set includes one or more subsets, and synchronization signal identities in the subsets indicate at least one of the following information: a timing reference of a first device is a network device; the timing reference of the first device is a third device that uses a network device as a timing parameter; the timing reference of the first device is a satellite; the timing reference of the first device is a third device that uses a satellite as a timing parameter; and the timing reference of the first device is the first device itself or a third device that is not synchronized with a network device or a satellite.

Optionally, the synchronization signal identity set includes two subsets, and different subsets correspond to different cyclic shift values of the first synchronization sequence and/or the second synchronization sequence.

Optionally, the synchronization signal identities in each subset of the two subsets are used to indicate any one of the following information: the timing reference of the first device is a network device, where the synchronization signal identity is determined from a first sequence subset; and the timing reference of the first device is not a network device, where the synchronization signal identity is determined from a second sequence subset.

Optionally, the synchronization signal identities in each subset of the two subsets are used to indicate any one of the following information: the timing reference of the first device is a network device, where the synchronization signal identity is determined from a first sequence subset; and the timing reference of the first device is a third device that uses a network device as a timing parameter, where the synchronization signal identity is determined from a second sequence subset.

Optionally, the synchronization signal identities in each subset of the two subsets are used to indicate any one of the following information: the timing reference of the first device is a satellite, where the synchronization signal identity is determined from a first sequence subset; and the timing reference of the first device is not a satellite, where the synchronization signal identity is determined from a second sequence subset.

Optionally, the synchronization signal identities in each subset of the two subsets are used to indicate any one of the following information: the timing reference of the first device is a satellite, where the synchronization signal identity is determined from a first sequence subset; and the timing reference of the first device is a third device that uses a satellite as a timing parameter, where the synchronization signal identity is determined from a second sequence subset.

Optionally, the synchronization signal identity set includes four subsets, and different subsets correspond to different cyclic shift values of the first synchronization sequence and/or the second synchronization sequence. The four sequence subsets each are used to indicate any one of the following information: the timing reference of the first device is a network device, where the synchronization signal identity is determined from a first sequence subset; the timing reference of the first device is a third device that uses a network device as a timing parameter, where the synchronization signal identity is determined from a second sequence subset; the timing reference of the first device is a satellite, where the synchronization signal identity is determined from a third sequence subset; and the timing reference of the first device is a third device that uses a satellite as a timing parameter, where the synchronization signal identity is determined from a fourth sequence subset.

Optionally, the synchronization signal identity set includes five subsets, and different subsets correspond to different cyclic shift values of the first synchronization sequence and/or the second synchronization sequence. The five sequence subsets each are used to indicate any one of the following information: the timing reference of the first device is a network device, where the synchronization signal identity is determined from a first sequence subset; the timing reference of the first device is a third device that uses a network device as a timing parameter, where the synchronization signal identity is determined from a second sequence subset; the timing reference of the first device is a satellite, where the synchronization signal identity is determined from a third sequence subset; the timing reference of the first device is a third device that uses a satellite as a timing parameter, where the synchronization signal identity is determined from a fourth sequence subset; and the timing reference of the first device is the first device itself or a third device that is not synchronized with a network device or a satellite, where the synchronization signal identity is determined from a fifth sequence subset.

According to the foregoing synchronization sequence design solution, the obtained synchronization sequence can be different from any synchronization sequence of a synchronization sequence set in the 5G NR system, thereby effectively reducing interference between a synchronization signal of another source synchronization device and a synchronization signal on the Uu link in the NR system. This improves synchronization performance between devices and minimizes a design difference between the synchronization signal of the another source synchronization device and the synchronization signal in the 5G NR system. Only a few modifications need to be made to the existing system to ensure synchronization performance between different services, to reduce restrictions on different systems or services deployed in a same area.

The following further describes, with reference to the foregoing embodiments, how to apply the synchronization sequence in the foregoing designs in the embodiments of this application.

Figure 5:
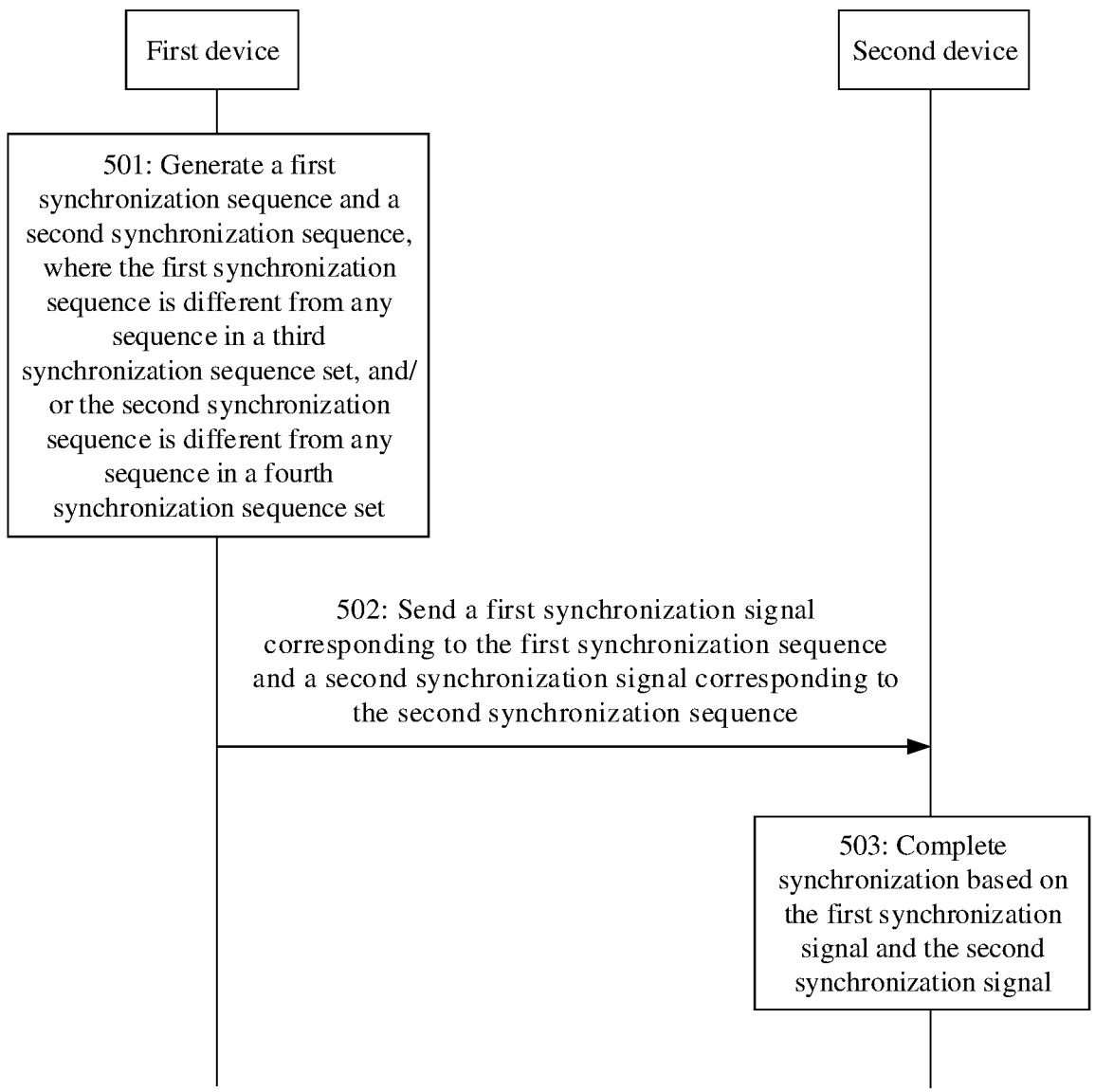
FIG. 5 is a schematic signaling diagram of a method according to an embodiment of this application.

An embodiment of this application provides a synchronization signal transmitting and receiving method. FIG. 5 is a schematic signaling diagram of a method according to an embodiment of this application. It should be noted that some steps in FIG. 5 and the following may be optional, and it is not limited in this embodiment of the present invention that all steps need to be included. In addition, sequence numbers of steps are merely used for description and do not represent a sequence. In addition, unless otherwise specified, in this embodiment of this application, a third synchronization sequence is the foregoing synchronization sequence $\bar{d}_{PSS}(n)$, and a fourth synchronization sequence is the foregoing synchronization sequence $\bar{d}_{SSS}(n)$.

Step 501: A first device generates a first synchronization sequence and/or a second synchronization sequence, where the first synchronization sequence is different from any sequence of a third synchronization sequence set, and/or the second synchronization sequence is different from any sequence of a fourth synchronization sequence set.

It should be noted that generation manners of the third synchronization sequence and the fourth synchronization sequence are described above, and details are not described herein again. The first device in this embodiment of this application may be a terminal device, a network device, or an apparatus that is in a terminal device or a network device and that performs the method in the embodiments of this application.

Possible designs and generation manners of the first synchronization sequence and the second synchronization sequence are described above, and details are not described herein again. It should be noted that the first device may generate only the first synchronization sequence, only the second synchronization sequence, or both the first synchronization sequence and the second synchronization sequence. When the first device generates only the first synchronization sequence or only the second synchronization sequence, the first device completes synchronization with a second device by using only one synchronization signal. When the first device generates both the first synchronization sequence and the second synchronization sequence, the first synchronization sequence may be a primary synchronization sequence, and the second synchronization sequence may be a secondary synchronization sequence.

Operations in this step may be implemented by the modem processor 304 in the terminal device described above.

Operations in this step may be implemented by the processor 201 in the network device described above.

Step 502: The first device transmits a first synchronization signal corresponding to the first synchronization sequence and/or a second synchronization signal corresponding to the second synchronization sequence. Correspondingly, the second device receives the first synchronization signal corresponding to the first synchronization sequence and/or the second synchronization signal corresponding to the second synchronization sequence.

After generating the first synchronization sequence and/or the second synchronization sequence, the first device maps the sequences to corresponding time domain symbols or frequency domain subcarriers of corresponding time domain symbols, generates the synchronization signals, and transmits the first synchronization signal and/or the second synchronization signal.

Correspondingly, the second device receives the first synchronization signal corresponding to the first synchronization sequence and/or the second synchronization signal corresponding to the second synchronization sequence.

Operations in this step may be implemented by the transceiver 301 in the terminal device described above. Certainly, operations may alternatively be implemented by controlling the transceiver 301 by the modem processor 304 in the terminal device described above.

Operations in this step may be implemented by the transceiver 202 in the network device described above. Certainly, operations may alternatively be implemented by controlling the transceiver 202 by the modem processor 201 in the network device described above.

Step 503: The second device obtains a synchronization signal identity $N_{ID}$ based on the first synchronization information and/or the second synchronization information.

Optionally, the second device determines a timing reference source of the first device based on the synchronization signal identity $N_{ID}$. It can be learned from the foregoing descriptions that the synchronization signal identity may be used to indicate the timing reference source of the first device. Correspondingly, the second device may determine the timing reference source of the first device by obtaining the synchronization signal identity $N_{ID}$. Optionally, the timing reference source is any one of the following: a network device, a non-network device, a third device using a network device as a timing parameter, a satellite, a non-satellite, the first device itself, a third device using a satellite as a timing parameter, or a third device that is not synchronized with a network device or a satellite.

Optionally, the second device obtains timing information based on the first synchronization signal and/or the second synchronization signal. Specifically, the second device receives and detects the first synchronization signal and/or the second synchronization signal based on a locally stored first synchronization sequence and/or second synchronization sequence or based on a signal feature of the first synchronization sequence and/or the second synchronization sequence. In this way, a boundary of a corresponding symbol, synchronization signal, slot, subframe, or radio frame is obtained. Then, an accurate location of each radio frame, subframe, slot, synchronization signal, or symbol is further determined with reference to an indication signal of a frame number, to obtain the timing information.

Optionally, that the second device obtains a synchronization signal identity $N_{ID}$ based on the first synchronization signal and/or the second synchronization signal includes: The second device obtains a first identity $N_{ID}^{(1)''}$ and/or a second identity $N_{ID}^{(2)''}$ based on the first synchronization signal and/or the second synchronization signal, and determines the synchronization signal identity $N_{ID}$ based on the first identity $N_{ID}^{(1)''}$ and/or the second identity $N_{ID}^{(2)''}$.

Optionally, that the second device determines the synchronization signal identity $N_{ID}$ based on the first identity $N_{ID}^{(1)''}$ and/or the second identity $N_{ID}^{(2)'}$ includes:

$N_{ID}=2N_{ID}^{(1)''}+N_{ID}^{(2)''}$, or $N_{ID}=N_{ID}^{(1)''}+N_{ID}^{(2)''}$.

It should be noted that the generation manners of the third synchronization sequence and the fourth synchronization sequence are described above, and details are not described herein again. The second device in this embodiment of this application may be a terminal device, a network device, or an apparatus that is in a terminal device or a network device and that performs the method in the embodiments of this application.

Operations in this step may be implemented by the modem processor 304 in the terminal device described above.

Operations in this step may be implemented by the processor 201 in the network device described above.

The first synchronization sequence and/or the second synchronization sequence transmitted by using the foregoing method can be different from any synchronization sequence of a synchronization sequence set in a 5G NR system, thereby effectively reducing interference between a synchronization signal of another source synchronization device and a synchronization signal on a Uu link in the NR system. This improves synchronization performance between devices and minimizes a design difference between the synchronization signal of the another source synchronization device and the synchronization signal in the 5G NR system. Only a few modifications need to be made to the existing system to ensure synchronization performance between different services, thereby simplifying possible system construction.

An example of the present invention further provides an apparatus (for example, an integrated circuit, a wireless device, or a circuit module), configured to implement the foregoing method. An apparatus for implementing a power tracker and/or a power generator described in this specification may be an independent device or may be a part of a larger device. The device may be: (i) an independent IC, (ii) a set of one or more ICs, where the set may include a memory IC configured to store data and/or an instruction, (iii) an RFIC such as an RF receiver or an RF transmitter/receiver, (iv) an ASIC such as a mobile station modem, (v) a module that can be embedded in another device, (vi) a receiver, a cellular phone, a wireless device, a handheld phone, or a mobile unit, or (vii) others.

The method and the apparatus provided in the embodiments of the present invention may be applied to a terminal device or a network device (which may be collectively referred to as a wireless device). The terminal device or the network device or the wireless device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in the embodiments of the present invention, a specific structure of an execution body of the method is not limited in the embodiments of the present invention, provided that the execution body can perform communication according to the signal transmission method in the embodiments of the present invention by running a program that records code of the method in the embodiments of the present invention. For example, the wireless communication method in the embodiments of the present invention may be performed by the terminal device or the network device, or a function module that is in the terminal device or the network device and that can invoke and execute a program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD)) or a digital versatile disc (dDVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, all or some of the embodiments may be implemented in a form of computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be understood that, sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in a form of a software functional unit and sold or used as an independent product, the functions may be stored in a computer-readable storage medium. Based on such an understanding, the technical solutions in the embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the method described in the embodiments of the present invention. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A method, comprising:
generating a sidelink primary synchronization sequence $d_1(n)$, wherein the sidelink primary synchronization sequence $d_1(n)$ satisfies:
$d_1(n)=1-2x(m')$, wherein:
$m'=(n+\Delta+43N_{ID}^{(2)})\mod 127$, $0 \leq n < 127$, $N_{ID}^{(2)} \in \{0,1,2\}$, and $\Delta=22$, wherein
$x(i+7)=(x(i+4)+x(i))\mod 2$, and
$[x(6)\ x(5)\ x(4)\ x(3)\ x(2)\ x(1)\ x(0)]=[1\ 1\ 1\ 0\ 1\ 1\ 0]$; and
transmitting a sidelink primary synchronization signal corresponding to the sidelink primary synchronization sequence $d_1(n)$.

2. The method according to claim 1, wherein the sidelink primary-first synchronization sequence $d_1(n)$ is a cyclic shift of any sequence $d_3(n)$ of a third synchronization sequence set, and wherein each sequence $d_3(n)$ of the third synchronization sequence set satisfies:

$$d_3(n) = 1 - 2x(m)$$
$$m = (n + 43 \cdot N_{ID}^{(2)})\mod 127,$$
$$0 \leq n < 127$$

wherein
$x(i+7)=(x(i+4)+x(i))\mod 2$, $N_{ID}^{(2)} \in \{0,1,2\}$, and
$[x(6)\ x(5)\ x(4)\ x(3)\ x(2)\ x(1)\ x(0)]=[1\ 1\ 1\ 0\ 1\ 1\ 0]$.

3. The method according to claim 2, wherein the sidelink primary-synchronization sequence $d_1(n)$ is different from each sequence $d_3(n)$ of the third synchronization sequence set.

4. The method according to claim 1, further comprising: generating a second synchronization sequence $d_2(n)$, wherein the second synchronization sequence $d_2(n)$ satisfies:
$d_2(n)=d_2^1(n)\cdot d_2^2(n)=[1-2x_0((n+m_0')\bmod 127)][1-2x_1((n+m_1')\bmod 127)]$, wherein $0\leq n<127$; and $$m_0' = 15\left\lfloor \frac{N_{ID}^{(1)'}}{112} \right\rfloor + \Theta + 5N_{ID}^{(2)'}$$

and $m_1'=N_{ID}^{(1)''} \bmod 112$, and wherein $N_{ID}^{(1)''}\in\{0,1,\ldots,335\}$, $N_{ID}^{(2)''}\in\{0,1,2\}$, and $\Theta$ is a non-zero integer, and wherein:
$x_0(i+7)=(x_0(i+3)+x_0(i))\bmod 2$, wherein $x_0(0)$ to $x_0(6)$ to are initial values; or
$x_0(i+7)=(x_0(i+4)+x_0(i))\bmod 2$, $x_1(i+7)=(x_1(i+1)+x_1(i))\bmod 2$, and wherein:
$[x_0(6)\ x_0(5)\ x_0(4)\ x_0(3)\ x_0(2)\ x_0(1)\ x_0(0)]=[0\ 0\ 0\ 0\ 0\ 0\ 1]$, and
$[x_1(6)\ x_1(5)\ x_1(4)\ x_1(3)\ x_1(2)\ x_1(1)\ x_1(0)]=[0\ 0\ 0\ 0\ 0\ 0\ 1]$; and
transmitting a second synchronization signal corresponding to the second synchronization sequence $d_2(n)$.

5. The method according to claim 4, wherein:
the second synchronization sequence $d_2(n)$ is different from each sequence $d_4(n)$ of a fourth synchronization sequence set, wherein the sequence $d_2^1(n)$ is a cyclic shift of a sequence $d_4^1(n)$, or the sequence $d_2^2(n)$ is a cyclic shift of a sequence $d_4^2(n)$; or generator polynomials corresponding to the second synchronization sequence $d_2(n)$ are different from generator polynomials corresponding to any sequence $d_4(n)$ of the fourth synchronization sequence set;
each sequence $d_4(n)$ of the fourth synchronization sequence set satisfies:

$$d_4(n) = d_4^1(n)\cdot d_4^2(n) = [1-2x_0((n+m_0)\bmod 127)][1-2x_1((n+m_1)\bmod 127)]$$
$$m_0 = 15\left\lfloor \frac{N_{ID}^{(1)}}{112} \right\rfloor + 5N_{ID}^{(2)}$$
$$m_1 = N_{ID}^{(1)} \bmod 112$$

the generator polynomials corresponding to the any sequence $d_4(n)$ of the fourth synchronization sequence set are:
$x_0(i+7)=(x_0(i+4)+x_0(i))\bmod 2$, $x_1(i+7)=(x_1(i+1)+x_1(i))\bmod 2$, $N_{ID}^{(2)}\in\{0,1,2\}$, $N_{ID}^{(1)}\in\{0,1,\ldots,335\}$, and
$[x_0(6)\ x_0(5)\ x_0(4)\ x_0(3)\ x_0(2)\ x_0(1)\ x_0(0)]=[0\ 0\ 0\ 0\ 0\ 0\ 1]$ and
$[x_1(6)\ x_1(5)\ x_1(4)\ x_1(3)\ x_1(2)\ x_1(1)\ x_1(0)]=[0\ 0\ 0\ 0\ 0\ 0\ 1]$.

6. The method according to claim 1, further comprising:
determining a synchronization signal identity $N_{ID}$ from a synchronization signal identity set; and
determining a first identity $N_{ID}^{(1)''}$ or a second identity $N_{ID}^{(2)''}$ based on the synchronization signal identity $N_{ID}$, wherein $N_{ID}^{(1)''}=N_{ID} \bmod 336$ and $N_{ID}^{(2)''}=\lfloor N_{ID}/336 \rfloor$.

7. The method according to claim 6, wherein the synchronization signal identity $N_{ID}$ is determined by a first device, the synchronization signal identity set comprises one or more subsets, and each subset of the one or more subsets separately indicates at least one of the following information:
that a timing reference of the first device is a network device;
that the timing reference of the first device is a second device that uses a network device as a timing reference;
that the timing reference of the first device is a satellite;
that the timing reference of the first device is a second device that uses a satellite as a timing reference; or
that the timing reference of the first device is the first device or a second device that is not synchronized with a network device or a satellite.

8. An apparatus, comprising:
one or more processors; and
a memory, wherein the memory stores a computer program executable by the one or more processors, and when the computer program stored in the memory is executed, the one or more processors execute operations comprising:
generating a sidelink primary synchronization sequence $d_1(n)$, wherein the sidelink primary synchronization sequence $d_1(n)$ satisfies:
$d_1(n)=1-2x(m')$, wherein:
$m'=(n+\Delta+43N_{ID}^{(2)''})\bmod 127$, $0\leq n<127$, $N_{ID}^{(2)''}\in\{0,1,2\}$, and $\Delta=22$, wherein
$x(i+7)=(x(i+4)+x(i))\bmod 2$, and
$[x(6)\ x(5)\ x(4)\ x(3)\ x(2)\ x(1)\ x(0)]=[1\ 1\ 1\ 0\ 1\ 1\ 0]$; and
transmitting a sidelink primary synchronization signal corresponding to the sidelink primary synchronization sequence $d_1(n)$.

9. The apparatus according to claim 8, wherein the sidelink primary-synchronization sequence $d_1(n)$ is a cyclic shift of any sequence $d_3(n)$ of a third synchronization sequence set, and wherein each sequence $d_3(n)$ of the third synchronization sequence set satisfies:
$d_3(n)=1-2x(m)$, wherein:
$m=(n+43\cdot N_{ID}^{(2)})\bmod 127$,
$x(i+7)=(x(i+4)+x(i))\bmod 2$, $N_{ID}^{(2)}\in\{0,1,2\}$, and
$[x(6)\ x(5)\ x(4)\ x(3)\ x(2)\ x(1)\ x(0)]=[1\ 1\ 1\ 0\ 1\ 1\ 0]$.

10. The apparatus according to claim 9, wherein the sidelink primary-synchronization sequence $d_1(n)$ is different from each sequence $d_3(n)$ of the third synchronization sequence set.

11. The apparatus according to claim 8, wherein the one or more processors further execute operations comprising:
generating a second synchronization sequence $d_2(n)$, wherein the second synchronization sequence $d_2(n)$ satisfies:
$d_2(n)=d_2^1(n)\cdot d_2^2(n)=[1-2x_0((n+m_0')\bmod 127)][1-2x_1((n+m_1')\bmod 127)]$, wherein $0\ n<127$; and $$m_0' = 15\left\lfloor \frac{N_{ID}^{(1)'}}{112} \right\rfloor + \Theta + 5N_{ID}^{(2)'}$$

and $m_1'=N_{ID}^{(1)''} \bmod 112$ wherein $N_{ID}^{(1)''}\in\{0,1,\ldots,335\}$, $N_{ID}^{(2)''}\in\{0,1,2\}$, and $\Theta$ is a non-zero integer,
wherein:
$x_0(i+7)=(x_0(i+3)+x_0(i))\bmod 2$, wherein $x_0(0)$ $x_0(6)$ to are initial values; or $x_0(i+7)=(x_0(i+4)+x_0(i))$mod 2, $x_1(i+7)=(x_1(i+1)+x_1(i))$ mod 2, and $[x_0(6)\ x_0(5)\ x_0(4)\ x_0(3)\ x_0(2)\ x_0(1)\ x_0(0)]=[0\ 0\ 0\ 0\ 0\ 0\ 1]$, and $[x_1(6)\ x_1(5)\ x_1(4)\ x_1(3)\ x_1(2)\ x_1(1)\ x_1(0)]=[0\ 0\ 0\ 0\ 0\ 0\ 1]$; and transmitting a second synchronization signal corresponding to the second synchronization sequence $d_2(n)$.

12. The apparatus according to claim 11, wherein:

the second synchronization sequence $d_2(n)$ is different from any sequence $d_4(n)$ of a fourth synchronization sequence set, wherein the sequence $d_2^1(n)$ is a cyclic shift of a sequence $d_4^1(n)$, or the sequence $d_2^2(n)$ is a cyclic shift of a sequence $d_4^2(n)$; or generator polynomials corresponding to the second synchronization sequence $d_2(n)$ are different from generator polynomials corresponding to any sequence $d_4(n)$ of the fourth synchronization sequence set; and the any sequence $d_4(n)$ of the fourth synchronization sequence set satisfies:

$$d_4(n) = \begin{array}{l} d_4^1(n) \cdot d_4^2(n) = \\ [1 - 2x_0((n + m_0)\text{mod } 127)][1 - 2x_1((n + m_1)\text{mod } 127)] \end{array}$$

$$m_0 = 15\left\lfloor \frac{N_{ID}^{(1)}}{112} \right\rfloor + 5N_{ID}^{(2)}$$

$$m_1 = N_{ID}^{(1)}\text{mod}112$$

the generator polynomials corresponding to the any sequence $d_4(n)$ of the fourth synchronization sequence set are:

$x_0(i+7)=(x_0(i+4)+x_0(i))$mod 2, $x_1(i+7)=(x_1(i+1)+x_1(i))$ mod 2, $N_{ID}^{(2)} \in \{0,1,2\}$, $N_{ID}^{(1)} \in \{0,1,\ldots,335\}$, and $[x_0(6)\ x_0(5)\ x_0(4)\ x_0(3)\ x_0(2)\ x_0(1)\ x_0(0)]=[0\ 0\ 0\ 0\ 0\ 0\ 1]$, and $[x_1(6)\ x_1(5)\ x_1(4)\ x_1(3)\ x_1(2)\ x_1(1)\ x_1(0)]=[0\ 0\ 0\ 0\ 0\ 0\ 1]$.

13. The apparatus according to claim 8, wherein the one or more processors further execute operations comprising:

determining a synchronization signal identity $N_{ID}$ from a synchronization signal identity set; and determining a first identity $N_{ID}^{(1)}$" or a second identity $N_{ID}^{(2)}$" based on the synchronization signal identity $N_{ID}$, wherein $N_{ID}^{(1)}$"$=N_{ID}$ mod 336, and $N_{ID}^{(2)}$"$=\lfloor N_{ID}/336 \rfloor$.

14. The apparatus according to claim 13, wherein the apparatus is applied to a first device, the synchronization signal identity set comprises one or more subsets, and each subset of the one or more subsets separately indicates at least one of the following information:

that a timing reference of the first device is a network device;

that the timing reference of the first device is a second device that uses a network device as a timing reference;

that the timing reference of the first device is a satellite;

that the timing reference of the first device is a second device that uses a satellite as a timing reference; or that the timing reference of the first device is the first device itself or a second device that is not synchronized with a network device or a satellite.

15. A non-transitory computer-readable storage medium storing instructions which, when executed by at least one processor of an apparatus, cause the apparatus to perform operations comprising:

generating a sidelink primary synchronization sequence $d_1(n)$, wherein the sidelink primary synchronization sequence satisfies:

$d_1(n)=1-2x(m')$, wherein $m'=(n+\Delta+43N_{ID}^{(2)}$"$)$mod 127, $0\leq n<127$, $N_{ID}^{(2)}$"$\in \{0,1,2\}$, and $\Delta=22$, wherein $x(i+7)=(x(i+4)+x(i))$mod 2, and $[x(6)\ x(5)\ x(4)\ x(3)\ x(2)\ x(1)\ x(0)]=[1\ 1\ 1\ 0\ 1\ 1\ 0]$; and transmit a sidelink primary synchronization signal corresponding to the sidelink primary synchronization sequence $d_1(n)$.

16. The non-transitory computer-readable storage medium according to claim 15, wherein the sidelink primary synchronization sequence $d_1(n)$ is a cyclic shift of any sequence of a third synchronization sequence set, and wherein each sequence of the third synchronization sequence set satisfies:

$d_3(n)=1-2x(m)$, $m=(n+43\cdot N_{ID}^{(2)})$mod 127, wherein $x(i+7)=(x(i+4)+x(i))$mod 2, $N_{ID}^{(2)} \in \{0,1,2\}$, and $[x(6)\ x(5)\ x(4)\ x(3)\ x(2)\ x(1)\ x(0)]=[1\ 1\ 1\ 0\ 1\ 1\ 0]$.

17. The non-transitory computer-readable storage medium according to claim 16, wherein the sidelink primary synchronization sequence $d_1(n)$ is different from each sequence of the third synchronization sequence set.

18. The non-transitory computer-readable storage medium according to claim 15, wherein the instructions, when executed by at least one processor of an apparatus, cause the apparatus to perform operations further comprising generating a second synchronization sequence $d_2(n)$, wherein the second synchronization sequence $d_2(n)$ satisfies:

$d_2(n)=d_2^1(n)\ d_2^2(n)=[1-2x_0((n+m_0')$mod $127)][1-2x_1((n+m_1')$mod $127)]$; and $$m_0' = 15\left\lfloor \frac{N_{ID}^{(1)'}}{112} \right\rfloor + \Theta + 5N_{ID}^{(2)'}$$

and $m_1'=N_{ID}^{(1)}$" mod 112, wherein $N_{ID}^{(1)}$"$\in \{0, 1, \ldots 335\}$, $N_{ID}^{(2)}$"$\in \{0,1,2\}$, and $\Theta$ is a non-zero integer; and wherein:

$x_0(i+7)=(x_0(i+3)+x_0(i))$mod 2, wherein $x_0(0)$ to $x_0(6)$ are initial values; or $x_0(i+7)=(x_0(i+4)+x_0(i))$mod 2, $x_1(i+7)=(x_1(i+1)+x_1(i))$ mod 2, and $[x_0(6)\ x_0(5)\ x_0(4)\ x_0(3)\ x_0(2)\ x_0(1)\ x_0(0)]=[0\ 0\ 0\ 0\ 0\ 0\ 1]$, $[x_1(6)\ x_1(5)\ x_1(4)\ x_1(3)\ x_1(2)\ x_1(1)\ x_1(0)]=[0\ 0\ 0\ 0\ 0\ 0\ 1]$; and transmit a second synchronization signal corresponding to the second synchronization sequence $d_2(n)$.

19. The non-transitory computer-readable storage medium according to claim 18, wherein:

the second synchronization sequence $d_2(n)$ is different from any sequence $d_4(n)$ of a fourth synchronization sequence set, wherein the sequence $d_2^1(n)$ is a cyclic shift of a sequence $d_4^1(n)$, or the sequence $d_2^2(n)$ is a cyclic shift of a sequence $d_4^2(n)$, or generator polynomials corresponding to the second synchronization sequence $d_2(n)$ are different from generator polynomials corresponding to each $d_4(n)$ sequence of the fourth synchronization sequence set;

each sequence $d_4(n)$ of the fourth synchronization sequence set satisfies:

$$d_4(n) = \begin{array}{c} d_4^1(n) \cdot d_4^2(n) = \\ [1 - 2x_0((n + m_0) \bmod 127)][1 - 2x_1((n + m_1) \bmod 127)] \end{array}$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

and
the generator polynomials corresponding to the any sequence $d_4(n)$ of the fourth synchronization sequence set are:
$x_0(i+7)=(x_0(i+4)+x_0(i)) \bmod 2$, $x_1(i+7)=(x_1(i+1)+x_1(i)) \bmod 2$, $N_{ID}^{(2)} \in \{0,1,2\}$, $N_{ID}^{(1)} \in \{0,1,\ldots,335\}$, and
$[x_0(6)\ x_0(5)\ x_0(4)\ x_0(3)\ x_0(2)\ x_0(1)\ x_0(0)]=[0\ 0\ 0\ 0\ 0\ 0\ 1]$, and
$[x_1(6)\ x_1(5)\ x_1(4)\ x_1(3)\ x_1(2)\ x_1(1)\ x_1(0)]=[0\ 0\ 0\ 0\ 0\ 0\ 1]$.

20. The non-transitory computer-readable storage medium according to claim 15, wherein the instructions, when executed by at least one processor of an apparatus, cause the apparatus to perform operations further comprising:

determining a synchronization signal identity $N_{ID}$ from a synchronization signal identity set; and determining a first identity $N_{ID}^{(1)'}$ or a second identity $N_{ID}^{(2)'}$ based on the synchronization signal identity $N_{ID}$, wherein $N_{ID}^{(1)'}=N_{ID} \bmod 336$ and $N_{ID}^{(2)'}=\lfloor N_{ID}/336 \rfloor$.

21. The non-transitory computer-readable storage medium according to claim 20, wherein the storage medium is comprised in a first device, the synchronization signal identity set comprises one or more subsets, and each subset of the one or more subsets separately indicates at least one of the following information:

that a timing reference of the first device is a network device;

that the timing reference of the first device is a second device that uses a network device as a timing reference;

that the timing reference of the first device is a satellite;

that the timing reference of the first device is a second device that uses a satellite as a timing reference; or that the timing reference of the first device is the first device itself or a second device that is not synchronized with a network device or a satellite.

* * * * *

UNITED STATES PATENT AND TRADEMARK OFFICE
CERTIFICATE OF CORRECTION

PATENT NO. : 11,696,245 B2
APPLICATION NO. : 17/171492
DATED : July 4, 2023
INVENTOR(S) : Li et al.

It is certified that error appears in the above-identified patent and that said Letters Patent is hereby corrected as shown below:

In the Specification

In Column 2, Line 15, delete "1][$x_1$" and insert -- 1], [$x_1$ --.

In Column 2, Line 63, delete "1]" and insert -- 1], --.

In Column 4, Line 19, delete "mod127]" and insert -- mod127)] --.

In Column 8, Line 2, delete "$N_{ID}^{(1)\prime}=N_{ID}^{(1)\prime\prime}$" and insert -- $N_{ID}^{(1)\prime}=N_{ID}$ --.

In Column 8, Line 55, delete "$N_{ID}$," and insert -- $N_{ID}$ --.

In Column 8, Line 67, delete "$N_{ID}^{(2)\prime}$" and insert -- $N_{ID}^{(2)\prime\prime}$ --.

In Column 9, Line 19, delete "mod2," and insert -- mod2, where --.

In Column 9, Line 22, delete "1]" and insert -- 1], --.

In Column 9, Line 48, delete "0,1, . . . ,335," and insert -- {0,1, . . . ,335}, --.

In Column 9, Line 54, delete "$\partial$" and insert -- $\Theta$ --.

In Column 10, Line 2, delete "x1(0)" and insert -- $X_1(0)$ --.

In Column 20, Line 62, delete "Δ=⌊43/R'=21," and insert -- $\Delta =\lfloor 43/R \rfloor =21$, --.

In Column 20, Line 63, delete "22" and insert -- 22. --.

In Column 21, Line 49, delete "κ<Δ<43" and insert -- 0<Δ<43, --.

Signed and Sealed this
Ninth Day of January, 2024

*Katherine Kelly Vidal*
Katherine Kelly Vidal
*Director of the United States Patent and Trademark Office*

CERTIFICATE OF CORRECTION (continued)
U.S. Pat. No. 11,696,245 B2

In Column 21, Line 53, delete "ID and ID" and insert -- $N_{ID}^{(1)}$ and $N_{ID}^{(2)}$ --.

In Column 24, Line 37, delete "$d_1^1(n)$" and insert -- $d_2^1(n)$ --.

In Column 25, Line 27, delete "$m_b$'" and insert -- $m_0$' --.

In Column 31, Line 43, delete "$N_{ID}=N_{ID}^{(1)''}+N_{ID}^{(2)''}$." and insert -- $N_{ID}=3N_{ID}^{(1)''}+N_{ID}^{(2)''}$. --.

In the Claims

In Column 36, in Claim 11, Line 56, delete "0 n<127;" and insert -- 0≤n<127; --.

In Column 36, in Claim 11, Line 63, delete "112" and insert -- 112, --.

In Column 36, in Claim 11, Line 66, delete "$x_0(0)$ $x_0(6)$ to" and insert -- $x_0(0)$ to $x_0(6)$ --.